US008655736B2

(12) United States Patent
Bharadwaj et al.

(10) Patent No.: US 8,655,736 B2
(45) Date of Patent: Feb. 18, 2014

(54) BUYER-SIDE CONSOLIDATION OF COMPATIBLE PURCHASE ORDERS

(75) Inventors: Suresh P. Bharadwaj, Frisco, TX (US);
Sumesh George, Bangalore (IN);
Hariharan Noorani, Bangalore (IN)

(73) Assignee: Infosys Limited, Bangalore (IN)

( * ) Notice: Subject to any disclaimer, the term of this patent is extended or adjusted under 35 U.S.C. 154(b) by 1029 days.

(21) Appl. No.: 11/965,717

(22) Filed: Dec. 27, 2007

(65) Prior Publication Data

US 2008/0312991 A1 Dec. 18, 2008

(30) Foreign Application Priority Data

Jun. 12, 2007 (IN) ............................ 1215/CHE/2007

(51) Int. Cl.
*G06Q 30/00* (2012.01)
*G06Q 10/00* (2012.01)

(52) U.S. Cl.
USPC ........................................ 705/26.1; 705/7.26

(58) Field of Classification Search
USPC ................. 705/26–27, 26.1–27.2, 7
See application file for complete search history.

(56) References Cited

U.S. PATENT DOCUMENTS

| | | | |
|---|---|---|---|
| 5,450,317 A | 9/1995 | Lu et al. | |
| 5,802,161 A | 9/1998 | Svoronos et al. | |
| 5,960,411 A * | 9/1999 | Hartman et al. | 705/26.81 |
| 6,167,378 A * | 12/2000 | Webber, Jr. | 705/7.25 |
| 6,529,797 B2 | 3/2003 | Williams et al. | |
| 6,615,226 B1 * | 9/2003 | Hartman et al. | 715/205 |
| 6,907,315 B1 * | 6/2005 | Hartman et al. | 700/216 |
| 6,970,825 B1 | 11/2005 | Altendahl et al. | |
| 7,222,087 B1 * | 5/2007 | Bezos et al. | 705/26.81 |
| 7,668,727 B2 * | 2/2010 | Mitchell et al. | 705/330 |
| 7,720,712 B1 * | 5/2010 | Allocca et al. | 705/27.1 |
| 7,792,705 B2 * | 9/2010 | Bezos et al. | 705/26.81 |
| 2002/0049622 A1 * | 4/2002 | Lettich et al. | 705/7 |
| 2002/0055831 A1 | 5/2002 | Swoboda | |
| 2002/0065642 A1 | 5/2002 | Swoboda | |
| 2002/0111785 A1 | 8/2002 | Swoboda et al. | |
| 2003/0037034 A1 * | 2/2003 | Daniels et al. | 707/1 |
| 2003/0097287 A1 | 5/2003 | Franz et al. | |
| 2004/0153379 A1 * | 8/2004 | Joyce et al. | 705/28 |

(Continued)

FOREIGN PATENT DOCUMENTS

WO WO/03/032227 7/2003

OTHER PUBLICATIONS

Bharadwaj et al., "Can Transportation Costs be Stemmed Even Before They Occur?" SETLabs Briefings, vol. 5, No. 3, Jul.-Sep. 2007, pp. 63-70.

(Continued)

*Primary Examiner* — Jason Dunham
*Assistant Examiner* — Ethan D Civan
(74) *Attorney, Agent, or Firm* — Klarquist Sparkman, LLP

(57) ABSTRACT

Systems and methods of buyer-side consolidation of compatible purchase orders are described herein. Purchase orders can be identified for consolidation using spatial and temporal proximity parameters. Purchase orders can be modified by changing a ship date or a delivery date and the changing can be based on a buyer input. Shipments can be consolidated based on the purchase order modifications and less than truckload shipments can be reduced. Consolidated shipments can be associated with different requested delivery dates, different suppliers, and/or different buyers. Buyer-side consolidation of compatible purchase orders can occur before purchase orders are processed by a transportation management system.

25 Claims, 27 Drawing Sheets

(56) References Cited

U.S. PATENT DOCUMENTS

| | | | |
|---|---|---|---|
| 2004/0193502 | A1 | 9/2004 | Heitner et al. |
| 2005/0086153 | A1 | 4/2005 | Scott |
| 2006/0036507 | A1 | 2/2006 | Pujar et al. |
| 2006/0129462 | A1* | 6/2006 | Pankl et al. .................. 705/26 |
| 2006/0173749 | A1* | 8/2006 | Ward et al. ................... 705/26 |
| 2006/0287926 | A1* | 12/2006 | Mitchell et al. ............... 705/26 |
| 2007/0061222 | A1* | 3/2007 | Allocca et al. ................ 705/26 |
| 2007/0106570 | A1* | 5/2007 | Hartman et al. .............. 705/26 |
| 2007/0106781 | A1* | 5/2007 | Hancock et al. ............. 709/223 |
| 2008/0004982 | A1* | 1/2008 | Bezos et al. .................. 705/26 |
| 2009/0030770 | A1* | 1/2009 | Hersh et al. .................... 705/9 |
| 2010/0185532 | A1* | 7/2010 | Allocca et al. ................ 705/27 |
| 2010/0274610 | A1* | 10/2010 | Andersen et al. ............... 705/8 |

OTHER PUBLICATIONS

Bharadwaj et al., "Infosys Supply Chain Transformation Solutions," Infosys White Papers, Nov. 2007, 10 pages.

Bharadwaj et al., "Leveraging Internal Visibility to Reduce Item Landed Costs," Infosys White Papers, Nov. 2007, 10 pages.

Bharadwaj, "Never Pay Retail," APICS Magazine, Jan. 2007, pp. 40-42.

Bharadwaj et al., "Supply Chain Transformation—Logistics Optimization (Improve your odds with Infosys Predictability)," PowerPoint presentation, emailed to two client representatives on Jun. 26, 2006, and discussed via telephone conference between the two client representatives and three Infosys employees on Jun. 28, 2006, 14 pages.

Bharadwaj et al., "Supply Chain Transformation Solution—Logistics Optimization (Win in the flat world)," PowerPoint presentation provided to a Gartner analyst (Dwight Klappich) on May 9, 2007, 15 pages.

Email from Suresh Prahlad Bharadwaj sent on May 9, 2007, to Dwight.klappich@gartner.com, RE: Higher Freight Costs Increase Need for Transportation Management Solutions, with the PowerPoint presentation "Supply Chain Transformation Solution—Logistics Optimization" attached when emailed, 2 pages.

"HighJump Transportation Advantage: On-Demand Transportation Management," HighJump Software, 2007, 12 pages.

Klappich, "Higher Freight Costs Increase Need for Transportation Management Solutions," Gartner, Jan. 2006, 5 pages.

"Transportation Management," Manhattan Associates, 2006, 6 pages.

"Information Delivers," Oracle, 2006, 12 pages.

"The E2e Advantage," RedPrairie, 2008, 8 pages.

* cited by examiner

Selected PO's successfully updated
32 Pos found, showing

| Sl # | PO # | Vendor Code | PO Line # | SKU | Category | Qty | Weight | WHSE Code | Original Delivery Date | Current Delivery Date | Suggested Delivery Date | Accept | Reject | Exclude | Edit |
|---|---|---|---|---|---|---|---|---|---|---|---|---|---|---|---|
| 1 | 123456 | V100 | 400 | 36363636 | GRO | 100 | 120.16 | 5631 | 03/03/2007 | 03/03/2007 | 03/02/2007 | ● | ○ | ○ | Edit |
| 2 | 216001 | V100 | 120 | 36363636 | GRO | 200 | 130 | 5631 | 03/03/2007 | 03/03/2007 | 03/02/2007 | ○ | ○ | ○ | |
| 3 | 123456 | V100 | 401 | 36363636 | GRO | 150 | 132 | 5631 | 03/03/2007 | 03/03/2007 | 03/02/2007 | ○ | ● | ○ | Edit |
| 4 | 122222 | V100 | 90 | 36363636 | GRO | 100 | 120 | 5631 | 03/03/2007 | 03/03/2007 | 03/022007 | ○ | ● | ○ | Edit |
| 5 | 216001 | V100 | 121 | 36363636 | GRO | 100 | 120 | 5631 | 03/03/2007 | 03/03/2007 | 03/02/2007 | ○ | ○ | ○ | |
| 6 | 122222 | V100 | 95 | 36363636 | GRO | 100 | 130 | 5631 | 03/03/2007 | 03/03/2007 | 03/02/2007 | ○ | ○ | ○ | |
| 7 | 123456 | V100 | 402 | 36363636 | GRO | 100 | 120 | 5631 | 03/03/2007 | 03/03/2007 | 0302/2007 | ○ | ○ | ● | Edit |
| 8 | 123456 | V100 | 403 | 36363636 | GRO | 100 | 130 | 5631 | 03/03/2007 | 03/03/2007 | 03/02/2007 | ○ | ○ | ● | Edit |

Accept All | Reject All | Exclude All | Submit | Reset

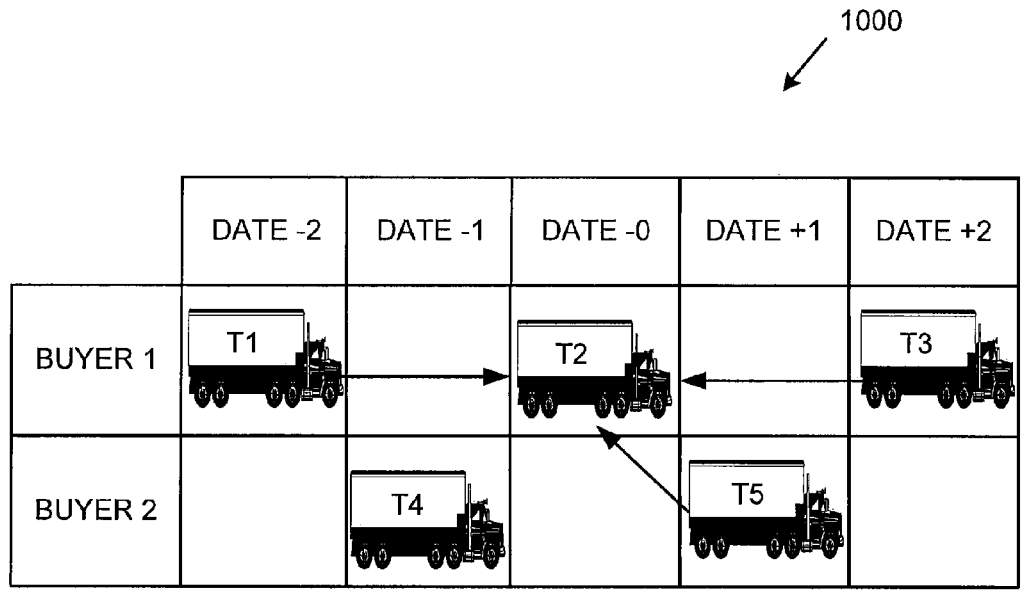
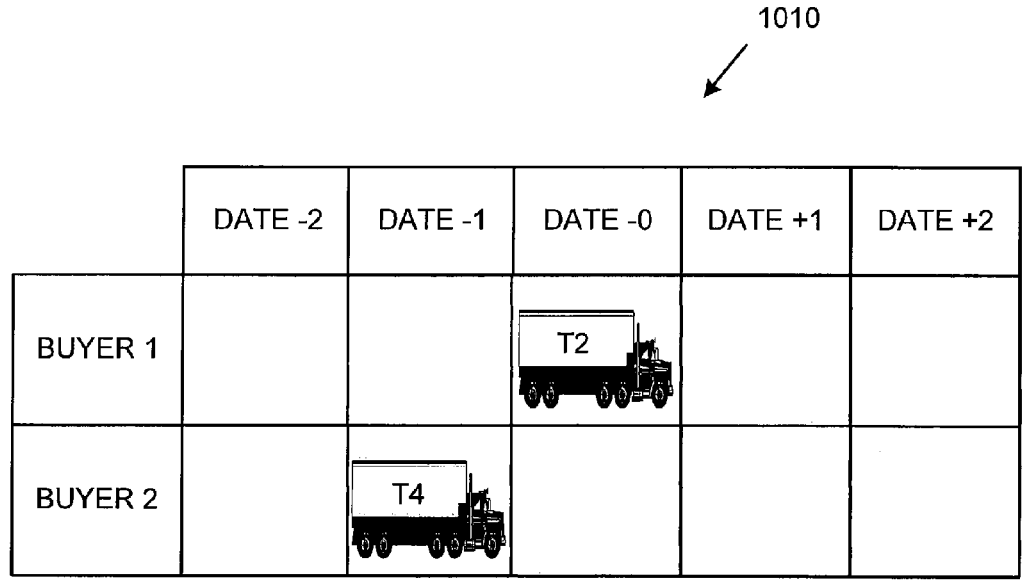
FIG. 10

Input Parameters
Process Dates: 03/01/2006 to 03/31/2006   Consolidation Type: Inbound
Radial Limit: 10   Days Limit: 1   Consolidation Level: 1

Cubing Parameters
Trailer Capacity  Pallets:   Weight: 40000   Volume: 2100   Mix Categories: Y

HOS Parameters
HOS Applicable: Yes   Wait Time: 30 (mins)   Loading Time: 120 (mins)   Trailer Speed: 40 (mph)
Drive Limit: 11 (hrs)   HOS Limit: 14 (hrs)   Distance Limit: 5 (miles)

Load Display: ● Pallets   ○ Weight   ○ Volume

Consolidation Results

| Select | Vendor Code | Vendor Zip | Ship Num |
|---|---|---|---|
| ☐ | 943500 | 14092 | M2579500 |
| ☐ | 426201 | 951120 | M2956300 |
| ☐ | 633000 | 93221 | M2462600 |
| ☐ | 16410 | 32948 | M2795300 |
| ☐ | 379770 | 98815 | M2870800 |
| ☐ | 188510 | 6608 | M2870600 |
| ☐ | 288710 | 90220 | M2795800 |
| ☐ | 211210 | 12110 | M2543900 |

Route Number: Route 5430-0 ▼

| Select | Locn Code | Locn Zip | Ship Num | Dely/Pick Date |
|---|---|---|---|---|
| ☐ | 176102 | 93912 | M2654800 | 2006-03-01 |
| ☐ | 176102 | 93912 | M2719500 | 2006-03-02 |

FIG. 22

BUYER-SIDE CONSOLIDATION OF COMPATIBLE PURCHASE ORDERS

BACKGROUND

Due to a number of factors, cost of transportation is becoming an increasingly important component of logistics planning and execution for retailers. Given that transportation costs and inventory costs pull in opposite directions, enterprises are struggling to find the right balance between the two.

For example, a buyer may be motivated to reduce inventory costs and by increasing the frequency of orders. However, more shipments can translate into increased transportation costs, which are typically borne by retailers. Transportation management systems (TMS) can combine shipments to some degree, but a transportation management system is constrained by the inputs provided to it which may not be optimal for the retailer in many cases.

The current state of the art is thus lacking in various respects.

SUMMARY

As described herein, buyer-side consolidation of compatible purchase orders can be achieved. In some embodiments, purchase order records are received from one or more buyer agents. One or more of the received purchase order records can be identified as compatible purchase order records. The identifying can comprise determining that at least one of the compatible purchase order records has a target ship date and one or more others of the compatible purchase order records has a different target ship date. Authorization from a buyer agent to modify the at least one of the compatible purchase order records can be received. Responsive to identification of the compatible purchase order records and the authorization from the buyer agent, the at least one of the compatible purchase order records can be modified.

In some embodiments, a first purchase order record having a first requested date is selected from stored purchase order records having respective requested dates. The first purchase order record and at least a portion of remaining stored purchase order records can be processed based on temporal proximity parameters. In some examples, the stored purchase order records are processed based on spatial proximity parameters. At least one purchase order record from the remaining stored purchase order records can be identified as compatible with the first purchase order record based on the processing. The respective requested date of the at least one compatible purchase order record can be changed to the first requested date. The compatible purchase order record having a changed date can be referred to as a modified purchase order record.

In some embodiments, a purchase order record is received from a buyer agent of a buyer. The purchase order record can have a requested date indicating a target ship date. Before the purchase order record is released by the buyer, one or more other stored purchase order records can be identified as compatible with the purchase order record. The buyer agent of the buyer can be provided with a user interface indicating a suggested date for the purchase order record that is different from the requested date. The suggested date can be a target ship date of one or more of the compatible purchase order records.

In some embodiments, a system can include one or more computer readable media storing purchase order records and corresponding requested target ship dates. The system can further include a processor configured to process the stored purchase order records based on temporal and spatial proximity parameters to identify compatible purchase order records, to determine whether respective requested target ship dates of the compatible purchase order records are changeable, and to change requested target ship dates of compatible purchase order records based on the determining.

The technologies described herein can facilitate consolidation of purchase orders at a planning stage in the supply chain process such as before submission to a supplier or processing by a transportation management system. In some examples, systems and methods of purchase order pre-processing can include suggesting alternate delivery dates for a purchase order; presenting suggested dates to buyers through an internal work flow; providing a buyer with a choice to accept, reject, or exclude the suggested dates; modifying a purchase order based on buyer input; and fine tuning purchase order modifications based on a vendor confirmation of the modified purchase order, delivery dates, or both.

Technologies described herein can support consolidation of purchase orders from different buyers, from different buyer agents, for different categories of products, for different vendors, having different requested delivery dates, and combinations thereof. The technologies can be internal to an organization and therefore relatively easy to implement. The technologies can be used in conjunction with transportation management systems and the technologies can be used to reduce transportation costs, for example, by reducing the occurrence of less than truckload shipments.

The foregoing and other features and advantages will become more apparent from the following detailed description of disclosed embodiments, which proceeds with reference to the accompanying drawings.

BRIEF DESCRIPTION OF THE FIGURES

FIG. 5 is a sample graphical user interface that can be used for requesting input from a user.

FIG. 10 is a block diagram of exemplary shipment consolidation in a supply chain with pre-processing.

FIG. 22 is a sample graphical user interface that can be used for displaying results from purchase order pre-processing for a user.

DETAILED DESCRIPTION

Example 1

Exemplary Supply Chain

Figure 1:
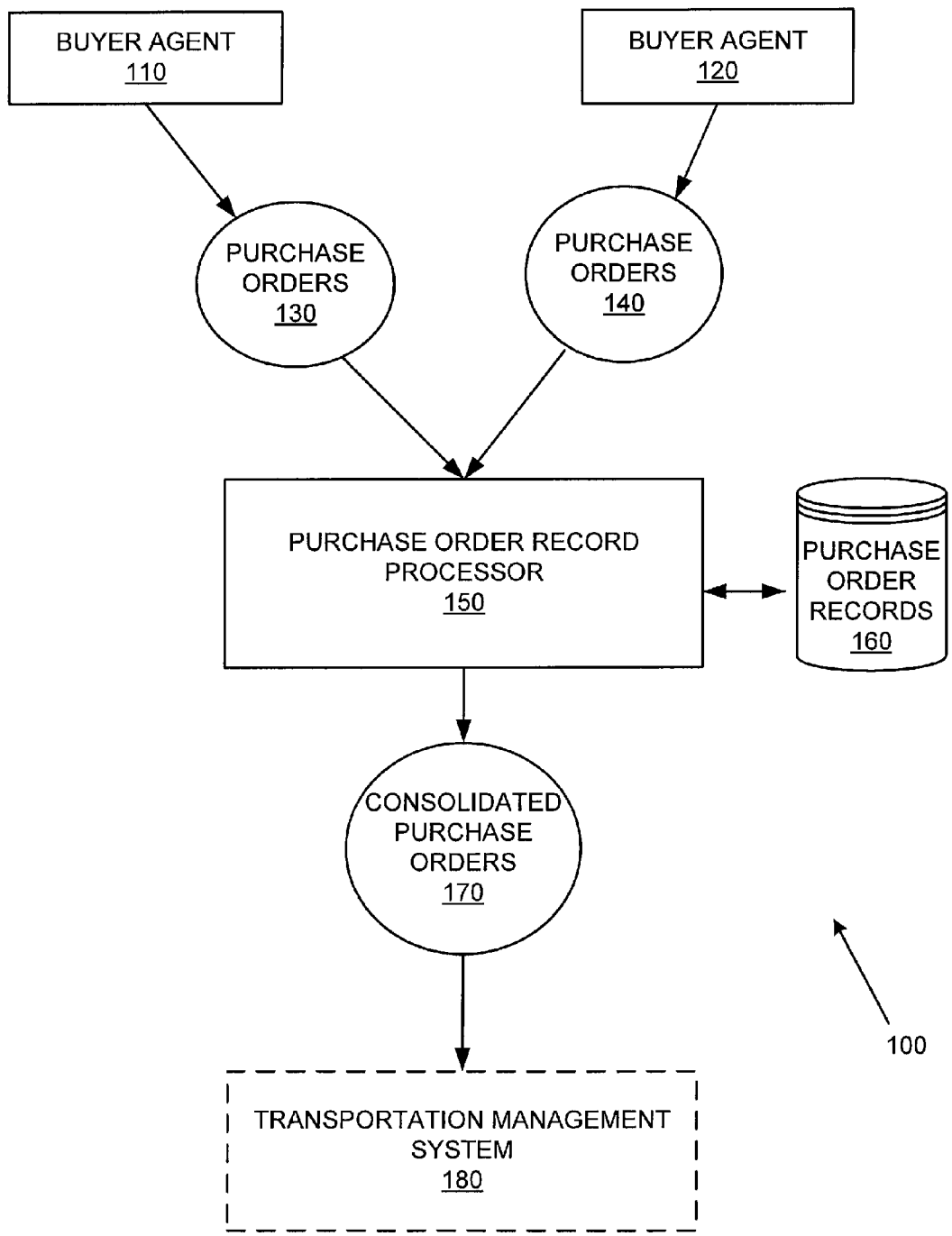
FIG. 1 is a block diagram of an exemplary system configured to consolidate purchase order records.

In general, a supply chain or logistics network system can move products, goods, or other items from a supplier to a buyer as a result of an offer to purchase the goods (e.g., an order). In general, an offer to purchase goods from a supplier by a buyer involves the exchange of a purchase order between the supplier and the buyer that describes terms or conditions of the purchase. The goods indicated by the purchase order can be referred to as order goods.

As part of the supply chain, the ordered goods are then transported from the supplier to the buyer. For example, goods can be loaded into a truck at a supplier warehouse and transported to a buyer warehouse. The transportation of ordered goods can be controlled by the supplier, the buyer, or other party (e.g., a carrier). Typically, the transportation of goods is organized by a transportation management system or other load building system. These systems can plan shipment and transportation needs for the ordered goods such as by organizing shipments, loads, truckloads, or other appropriate shipping units. For example, a transportation management system managing a fleet of trucks can organize the transport of the ordered goods by assigning pallets of goods, delivery schedules, and routes to each truck in the fleet. Often, a transportation management system is implemented by a vendor at the execution stage of the supply chain process, e.g., after purchase orders are accepted by the vendor and can no longer be modified.

Typically, shipments organized by a transportation management system, demand planning system, or other load building system are inefficient and generate a large number of truckloads or shipments of less than full capacity, i.e., less than truckload (LTL) shipments. LTL shipments can be shipments that weigh between about 100 and about 15,000 lbs, and consist of 1 to 6 pallets or pallet spots. Less than truckload carriers typically collect freight from various shippers and consolidate that freight onto enclosed trailers for line-haul to a delivering terminal or to a hub terminal where the freight can be further sorted and consolidated for additional line-hauls. Transporting goods in a large number of LTL shipments is generally more costly than consolidating the LTL shipments into fewer shipments or into full truckload shipments. For example, freight rates can be higher for LTL shipments than for full truckload shipments. Therefore, potentially lower transportation costs are not being realized when shipments are organized by current systems.

In addition, a frequency of LTL shipments can be high because companies may be motivated to reduce inventory. For example, a vendor who controls the shipment of goods to buyers can choose to ship smaller loads more frequently to reduce inventory. As a result, the number of LTL shipments increases, and extra costs associated with transporting less than full loads are generally passed on to the buyers through higher prices.

The efficiency of supplier-to-buyer transportation in a supply chain process can be improved by implementing the technologies described herein. By improving supply chain efficiency, transportation costs can also be reduced. For example, the technologies can anticipate opportunities for shipment consolidation during the planning stage of the supply chain (e.g., before purchase orders are submitted to a transportation management system or to a supplier) and therefore reduce the number of separate shipments generated by a transportation management system.

Example 2

Exemplary Purchase Order Consolidation

FIG. 1 is a block diagram of an exemplary system 100 configured to consolidate purchase orders in a supply chain. In the system 100, buyer agents 110, 120 submit purchase orders 130, 140 to a processor 150. Purchase orders 130, 140 are represented by purchase order records in a database 160. The processor 150 is configured to process the submitted purchase orders 130, 140 and the database of purchase order records 160. The processor 150 is configured to generate consolidated purchase orders 170 which can be submitted to a transportation management system 180.

Consolidated purchase orders 170 are based on submitted purchase orders 130, 140. For example, consolidated purchase orders can include modified versions of purchase orders 130, 140 (e.g., modified by the processor 150).

By submitting purchase orders 130, 140 to the processor 150 before the transportation management system 180, buyer agents can reduce a number of shipments such as LTL shipments generated by the transportation management system 180. For example, the number of shipments generated by the transportation management system 180 can be reduced when the consolidated purchase orders 170 are processed by the transportation management system 180 instead of the purchase orders 130, 140. Therefore, transportation costs associated with the consolidated purchase orders 170 can be lower than transportation costs associated with the purchase orders 130, 140. In general, buyers agents can reduce transportation costs for shipments associated with the purchase orders 130, 140 by using the processor 150 in the supply chain.

The processor 150 need not directly transmit the consolidated purchase orders 170 to the transportation management system 180 but may instead submit the consolidated purchase orders 170 to one or more intermediaries such as a vendor or a carrier The transportation management system 180 can be controlled by one or both buyer agents 110, 120 or another buyer agent. Or, the transportation management system 180 can be controlled by a vendor or other party. The transportation management system 180 can be any system used to organize shipments associated with purchase orders. The transportation management system 180 can be any load building processor described herein and can be considered external to the system 100.

In practice, the system 100 can be more complicated, such as with additional buyer agents, suppliers, processors, transportation management systems, and intermediaries.

Example 3

Exemplary Method of Purchase Order Record Consolidation

Figure 2:
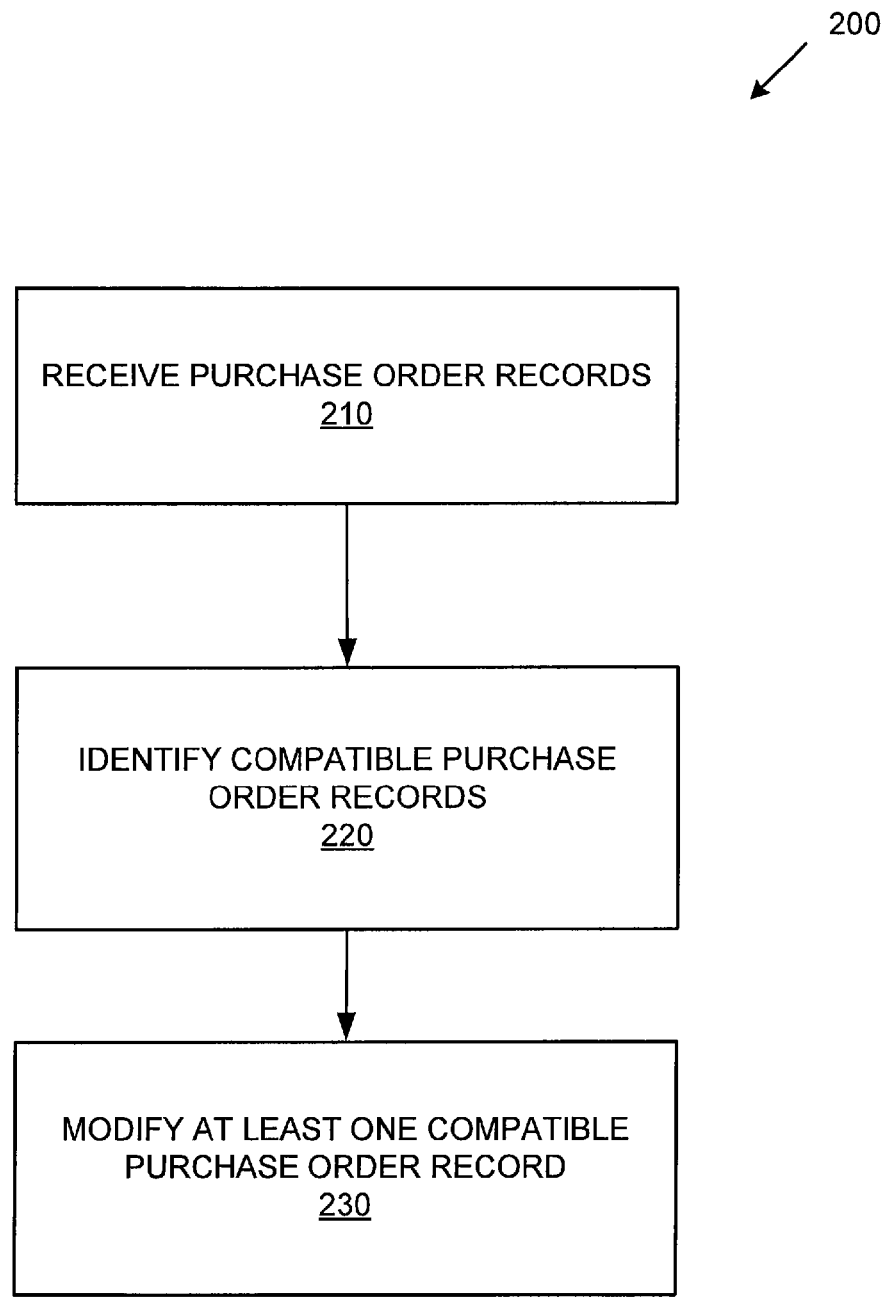
FIG. 2 is a flowchart of an exemplary method of consolidating purchase order records.

FIG. 2 is a flowchart of an exemplary method 200 of consolidating purchase order records. Method 200 and variants of it can be used in the examples described herein. For example, the method 200 can be performed by the processor 150 of FIG. 1.

At 210, purchase order records are received. For example, purchase orders can be processed to generate corresponding purchase order records.

At 220, compatible purchase order records are identified. The identifying can include processing the purchase order records according to spatial process parameters, temporal process parameters, or both, and identifying compatible purchase order records having different target ship dates. For example, it can be determined that at least one of the compatible purchase order records has a target ship date and one or more others of the compatible purchase order records has a different target ship date. The identifying can further include determining that shipments associated with the compatible purchase order records can be consolidated (e.g., according to spatial process parameters, temporal process parameters, or both).

At 230, responsive to identifying the compatible purchase order records, at least one of the compatible purchase order records is modified. The modifying can comprise consolidating the at least one of the compatible purchase order records and the one or more others of the compatible purchase order records having a different target ship date for shipment the same day. For example, the modifying can include changing the target ship date associated with the at least one of the compatible purchase order records to be the different target ship date (e.g., changing the target ship dates to be a same date).

The described actions can be performed by a logistics pre-processing system or other system.

Example 4

Exemplary Buyer-Side Purchase Order Record Processing

In any of the examples herein, processing of purchase order records (e.g., to identify and consolidate compatible purchase order records) can be buyer-side processing of purchase order records. In exemplary buyer-side processing, purchase order records are processed and consolidated based on buyer control. For example, the purchase order records can be processed by software under control of a buyer or the buyer can otherwise control consolidation (e.g., by providing feedback on consolidation suggestions, providing parameters guiding consolidation, or the like).

Because buyer-side processing of purchase order records can be implemented before the purchase order records are sent to the supplier or before the purchase order records are processed by a load building processor, buyer-side processing is sometimes called "pre-processing" (e.g., processing before the purchase order records are released to a supplier for processing such as in a transportation management system or before the purchase order records are received by a load building processor). Such pre-processing is sometimes referred to as processing during a "planning stage" (e.g., while a purchase order record can be modified such as by a buyer; in contrast with an execution stage when a purchase order record is under supplier control). For example, the purchase order record is not finalized.

Buyer-side processing can facilitate buyer control of inbound shipment logistics such as through adoption of a "collect" model of paying for transportation (e.g., the buyer pays freight invoices directly to a carrier).

However, buyer-side purchase order record processing can be achieved even if the purchase order records are released to the supplier (e.g., if there is a mechanism in place by which the buyer can continue to control consolidation).

Because processing of purchase order records can be done without involvement of the vendor, the technologies herein can be implemented as an internal work flow (e.g., internal to the buyer).

Example 5

Exemplary Buyers

In any of the examples herein, a buyer is an entity that orders goods (e.g., for purchase) from a supplier. For example, a retailer acts as a buyer when purchasing goods or products from a manufacturer, vendor, importer, wholesaler, or other supplier. Manufacturers, vendors, importers and wholesalers can also act as buyers when purchasing goods or materials from suppliers of such goods or materials.

A buyer agent can represent an entity such as an enterprise, a retailer, a business, a company or other organization. A buyer agent can be an employee or an individual associated with the entity. A buyer agent can be associated with a username and a password or with an account. Buyer agents can be different persons or business units within a same entity (e.g., two departments within a retail store). Buyer agents within a same entity can be connected through an internal work flow. The technologies can support processing of purchase order records from one or more different buyers, from one or more buyer agents, or both.

A buyer or buyer agent is generally associated with one or more buyer locations such as a warehouse, a store, or a distribution center.

Example 6

Exemplary Purchase Order Records

In any of the examples herein, a purchase order record represents goods ordered from a supplier by a buyer. The purchase order records can be drawn from purchase orders (e.g., purchase requests, purchase records, or other contract) and purchase order records can reflect the information in the purchase order. For example, individual line items of a purchase order or entire purchase orders can be represented as one or more purchase order records. Purchase order records can thus be generated by converting purchase order line items into purchase order records. Purchase order records can be represented by lines in a staging or reference table. A purchase order record can eventually be associated with a shipment of the ordered goods.

An exemplary purchase order record can have time-based information, spatial information, a purchase order record number or other identifier, a billing address, a buyer identity or identification number, a supplier identity or identification number, a cost or amount due, identification information of ordered goods (e.g., quantity of product, product identifier, or the like), other terms or conditions of the sale, or combinations thereof.

Exemplary time-based information of a purchase order record can include target ship dates as described herein.

Exemplary spatial information of a purchase order record can include one or more locations such as a location of a supplier, a location of a buyer, a ship to location, and a ship from location. The supplier location can be the location of a source of goods to be transported to a buyer such as a supplier warehouse. The supplier location can be a ship from location. The buyer location can be the destination for the goods transported from the supplier to the buyer such as a buyer warehouse, a distribution center, or a store. The buyer location can be a ship to location. A location can be indicated by a zip code, an address, a relative distance, a radial distance, a general region, coordinates or other appropriate information that can identify a geographical location.

Purchase order records can be stored in a database, such as in the form of electronic data interchange (EDI) documents, XML documents, or other electronic documents (e.g., stored in a computer-readable storage media).

Purchase order records can be created, for example, by a buyer, buyer agent, or any individual or system representing a buyer. For example, a purchase order record can be created by demand planning tools or other forecasting tools, or purchase order records can be created by a buyer or retailer employee. Purchase order records can be created by multiple buyers and can be submitted through an internal work flow to a common database or processor.

Purchase order records can be processed according to any of the technologies described herein, such as according to pre-processing methods and using pre-processing systems described herein. The technologies herein can support processing purchase order records having different buyers, different buyer agents, different categories of products, different vendors, different target ship dates, or combinations thereof.

Advance ship notices (ASN), delivery appointment schedules, and information from a web portal or supplier portal can also be processed in a similar manner to (e.g., represented as) purchase order records and according to any of the technologies described herein. An advance ship notice can be a notice of a shipment that is generated before delivery of the shipment such that the notice indicates an intended delivery date. Appointment schedules can correspond to an approximate time of arrival of a shipment. For example, an appointment can be between a truck driver delivering a shipment and a receiving warehouse. Although appointment schedules are generally a reliable indicator of a shipment, appointment schedules are often produced late in the supply chain process when modifications can no longer be made. When available for modification, appointment schedules and advance ship notices can be pre-processed according to any of the technologies described herein.

Example 7

Exemplary Target Ship Dates

In any of the examples herein, a purchase order record can have an associated target ship date that indicates when ordered goods represented by the purchase order record are to be shipped or delivered. A target ship date can be a day of the week, a calendar date, a relative date such as a number of days, or combinations thereof.

A target ship date can be specified as a ship date (e.g., a date that a shipment containing the ordered goods is shipped or a date that the shipment is expected to be shipped) or a target ship date can be specified as a delivery date (e.g., a date that a shipment of goods is to be delivered to a buyer or a date that the shipment is expected to arrive at a buyer warehouse). If a time of transit between a supplier and a buyer is known, a ship date can be determined based on the delivery date and the time of transit. Conversely, a delivery date can be determined based on a ship date and the time of transit.

A requested date can be a date that is requested by a buyer or other party in the supply chain and can be a target ship date (e.g., a delivery date or a ship date). A requested date of a purchase order record can be a date (e.g., a target ship date) requested by a buyer for a shipment eventually associated with the purchase order record. A requested date can be an original date which can be a date that is requested by a buyer in an original (e.g., unmodified) purchase order record. A current date can be an original date or a current date can be an updated date (e.g., modified) date such as a date that is different from an original date.

Example 8

Exemplary Compatible Purchase Order Records

In any of the examples herein, purchase order records that have been identified through processing of purchase order records (e.g., according to process parameters) can be identified as compatible and processed accordingly. Compatible purchase order records are purchase order records that can be consolidated. Compatible purchase order records can be associated with shipments that can be consolidated or shipped together in fewer shipments.

Compatible purchase order records can be spatially compatible, temporally compatible, or both. Purchase order records that have been identified through processing of purchase order records according to spatial process parameters can be identified as spatially compatible purchase order records. Purchase order records that have been identified through processing of purchase order records according to temporal process parameters can be identified as temporally compatible purchase order records.

Compatible purchase order records can have different target ship dates, different locations, different suppliers, different buyers, different types of products, or a combination thereof.

For example, if a first purchase order record associated with a first vendor and a second purchase order record associated with a second vendor are located in the same zip code or within a pre-determined distance of each other, the first and second purchase order records can be identified as compatible purchase order records when processed according to a spatial process parameter designating a same zip code or the predetermined distance. Because the first and second purchase order records are associated with vendors in a same general geographical vicinity, an opportunity to consolidate shipments associated with the first and second purchase order records exists.

If a first purchase order record is associated with a first ship date and a second purchase order record is associated with a second ship date one day after the first date, the first and second purchase order records can be identified as compatible purchase order records when processed according to a temporal process parameter designating a timeframe of plus or minus one day, for example. Because the first and second purchase order records are associated with ship dates within the timeframe, the first and second purchase order records can be consolidated. For example, shipments eventually associated with the first and second purchase order records can be consolidated by modifying the first or second purchase order record to have the same date as the other.

Example 9

Exemplary Consolidation

In any of the examples herein, exemplary consolidation can consolidate or otherwise combine one or more shipments with another shipment. A shipment can be a load, truckload, or other shipping unit for transporting goods or products (e.g., ordered goods) from one location to another. Exemplary consolidation can include combining at least one shipment associated with at least one purchase order record with another shipment. The shipments that are consolidated can be LTL shipments and LTL shipments can be consolidated into other LTL shipments or into full truckload shipments. Consolidated shipments can be associated with different vendors, buyers, buyer agents, and combinations thereof. Whether shipments can be consolidated can depend on load building parameters used by a load building processor and on compatibility of associated purchase order records.

A purchase order record can be modified based on compatibility with another purchase order record and such a modification is sometimes called "consolidating" the purchase order records. For example, a target ship date of a first purchase order record can be changed to be the target ship date of a second, temporally compatible, purchase order record in order to consolidate the first and second purchase order records. In some examples, consolidated purchase orders can be attached or otherwise electronically combined or associated.

Consolidated purchase order records are associated with potential consolidated shipments. Consolidated purchase order records can be processed by a load building processor to generate consolidated shipments. A purchase order record can be modified or consolidated with another purchase order record because shipments eventually associated with the purchase order record and with the other purchase order records can be consolidated.

Consolidated purchase order records can have different buyers, different categories of products, different vendors, different original target ship dates, and combinations thereof.

Example 10

Exemplary Purchase Order Consolidation

Figure 3:
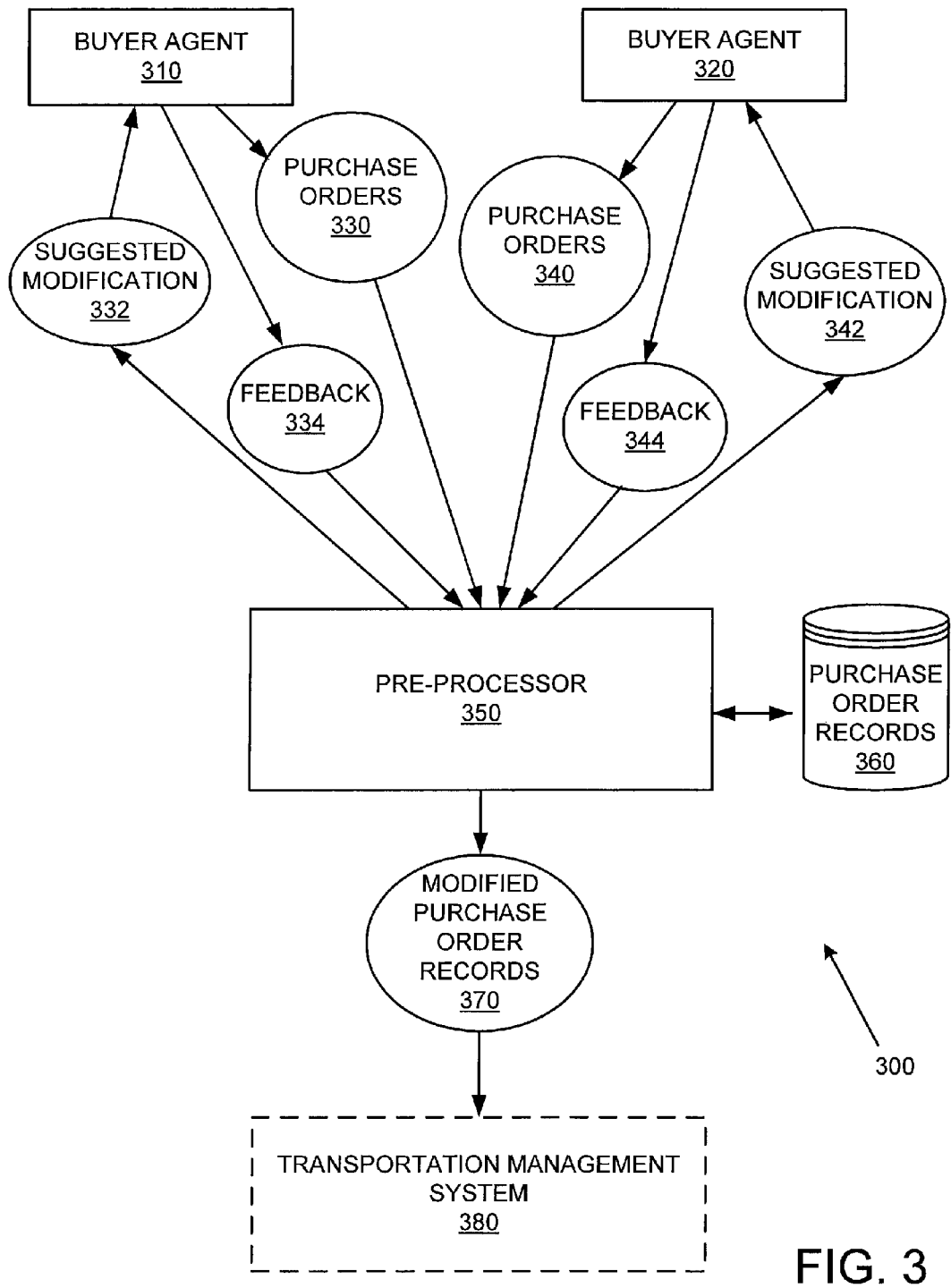
FIG. 3 is a block diagram of an exemplary system configured to consolidate purchase order records having different target ship dates based on user feedback on suggested modifications to target ship dates.

FIG. 3 is a block diagram of a exemplary system 300 configured to consolidate purchase orders having different target ship dates based on user feedback on suggested modifications to the target ship dates. In the system 300, buyer agents 310, 320 submit purchase orders 330, 340 to a pre-processor 350. The pre-processor 350 processes the submitted purchase orders 330, 340 and references a database of purchase order records 360 (e.g., containing information from the purchase orders 330, 340 and others).

The pre-processor 350 is configured to provide suggested modifications 332, 342 to the respective buyer agents 310, 320. The suggested modifications 332, 342 are based on the purchase order records in the database 360. The suggested modification 332 can be, for example, a suggested new target ship date associated with the purchase order 330. Different buyer agents 310, 320 can be provided different suggested modifications 332, 342.

Buyer agents 310, 320 can provide feedback 334, 344, respectively, based on the suggested modifications 332, 342, thereby controlling consolidation of compatible purchase order records. For example, buyer agents can send an acceptance or a rejection of a suggested modification to the pre-processor 350. Modified purchase order records 370 are generated by the pre-processor 350 and can be submitted to a transportation management system 380. The modified purchase order records 370 are based on the feedback 334, 344, and on the suggested modifications 332, 342. The modified purchase order records 370 can correspond to a same purchase as a submitted purchase order but have a different target ship date relative to the submitted purchase order. For example, if a buyer agent 310 receives a suggested modification 332 that is a suggested target ship date for the purchase order 330 and transmits an acceptance command 334 to the pre-processor 350, the modified purchase order record 370 can be the purchase order 330 with a target ship date changed to the suggested target ship date. Modified purchase order records can optionally be based in part on vendor feedback.

The pre-processor 350 may not directly transmit modified purchase order records 370 to the transportation management system 380 but may instead submit the modified purchase order records 370 to one or more intermediaries such as a vendor or a carrier.

The transportation management system 380 can be controlled by one or both buyer agents 310, 320 or a different buyer agent. Or, the transportation management system 380 can be controlled by a vendor or other third party. The transportation management system 380 can be any system used to organize shipments associated with purchase order records. The transportation management system 380 can be any load building processor described herein and can be external to the system 300.

In practice, the supply chain 300 can be more complicated, such as with additional buyer agents, suppliers, pre-processors, transportation management systems, and intermediaries.

Example 11

Exemplary Method of Purchase Order Record Pre-Processing

Figure 4:
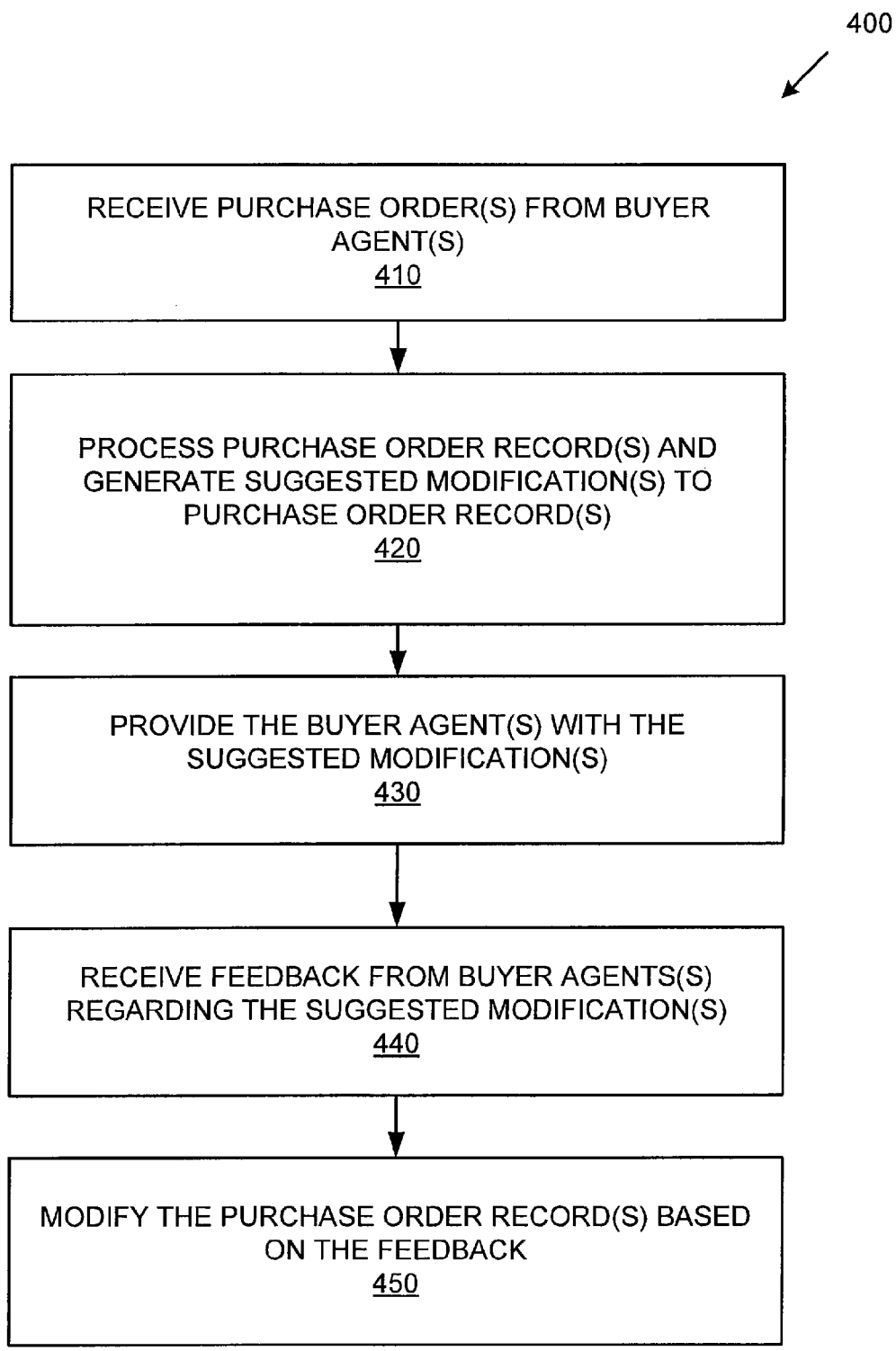
FIG. 4 is a flowchart of an exemplary method of consolidating purchase order records having different target ship dates based on user feedback on suggested modifications to target ship dates.

FIG. 4 is a flowchart of an exemplary method 400 of purchase order record pre-processing. Method 400 and variants of it can be used in the examples described herein. For example, the method 400 can be performed by the pre-processor 350 of FIG. 3 or the processor 150 of FIG. 1.

At 410, purchase order(s) are received from buyer agent(s). The purchase order(s) can be converted to purchase order record(s).

At 420, purchase order record(s) are processed and suggested modification(s) to purchase order record(s) are generated. Purchase order records can be processed according to any of the technologies described herein. For example, the processing can include comparing the purchase order record(s) to stored purchase order records based on a purchase order record target ship date.

At 430, the buyer agent(s) are provided with the suggested modification(s). The providing can include, for example, displaying the suggested modification to the buyer agent(s) on a monitor or other display.

At 440, feedback regarding the suggested modification(s) is received from the buyer agent(s). For example, the receiving can include receiving an indication to accept or reject the suggested modification.

At 450, the purchase order record(s) are modified based on the feedback. For example, the modifying can include changing a target ship date associated with at least one of the purchase order record(s).

The modified purchase order record(s) can then be transmitted to a transportation management system.

Example 12

Exemplary Suggested Modifications

In any of the examples herein, a suggested modification is a change or other modification that is generated based on processing of purchase order records, wherein the processing is performed according to any of the technologies described herein. In general, a suggested modification is a change to a compatible purchase order record that, if made, can consolidate purchase order records. A suggested modification can be, for example, a suggested date such as a suggested target ship date. A suggested target ship date can be a date that is before or after an original target ship date of a purchase order record.

One or more suggested modifications can be presented or provided to one or more users such as through an internal work flow. A suggested modification can be provided to a user via an interface such as a graphical user interface. Different users can be presented different suggested modifications based on purchase order records submitted by the respective users. A user can be an exemplary buyer agent as described herein.

A user that is provided one or more suggested modifications can provide feedback based on the suggested modification. Feedback, in any of the examples herein, can be permission or authorization to modify a purchase order record based on a suggested modification. Exemplary feedback can be an acceptance, a rejection, an exclusion, or the like. For example, the user can provide an acceptance of the suggested modification of a purchase order record and, as a result, the purchase order record can be changed such as by updating the purchase order record in a database to reflect the suggested modification. If the user provides a rejection of the suggested modification, the purchase order record remains unchanged but may be processed additionally. The user can also indicate that a purchase order record is to be excluded from processing such as by providing an exclusion. Responsive to receiving the indication to exclude, the purchase order record can be designated as not eligible for suggested modifications.

A purchase order record can, in some examples, be modified based on a suggested modification automatically such as without feedback. For example, a processor can be configured to automatically modify a purchase order record if the suggested target ship date is different from an original target ship date of the purchase order record by only plus or minus n days (e.g., one day or the like). Suggested modifications of more than n days can then be provided to a user for feedback. Automatic modifications can be authorized by a user such as in advance of pre-processing or during configuration of a processor.

Example 13

Exemplary User Interface

FIG. 5 is a sample graphical user interface 510 for requesting input (e.g., feedback regarding a suggested modification) from a user. In general, the graphical user interface 510 displays purchase order records associated with respective suggested modifications such as suggested delivery dates and provides the user with a choice to accept/reject/exclude the respective suggested modifications.

The sample graphical user interface 510 can display purchase order records and information associated with the purchase order records such as a purchase order record number, a vendor code, product information, current delivery date, original delivery date, suggested delivery date, and the like. The user can indicate using the graphical user interface 510 whether to accept a suggested modification such as by clicking a button or entering information.

The graphical user interface 510 can include "edit" hyperlinks associated with purchase order records. For example, by clicking on the hyperlinks, a user can view or edit the respective purchase order record. Each purchase order record displayed on the graphical user interface 510 can be associated with one or more buttons such as radio buttons that can be activated by a user to indicate a choice. The graphical user interface 510 can include user interactive buttons such as "accept all," "reject all," "exclude all," "submit," and "reset" buttons. The graphical user interface 510 can be per-purchase order record selectable such that a purchase order record can be edited or marked independently of others.

In any of the examples herein, a user interface for requesting user feedback (e.g., graphical user interface 510) can be configured as a dashboard-like tool, as part of a web-based interface, web portal, or the like. The user interface for requesting user feedback can include more or fewer fields and/or buttons than those shown in FIG. 5 as appropriate for a particular implementation.

Example 14

Exemplary Logistics Pre-Processing System

Figure 6:
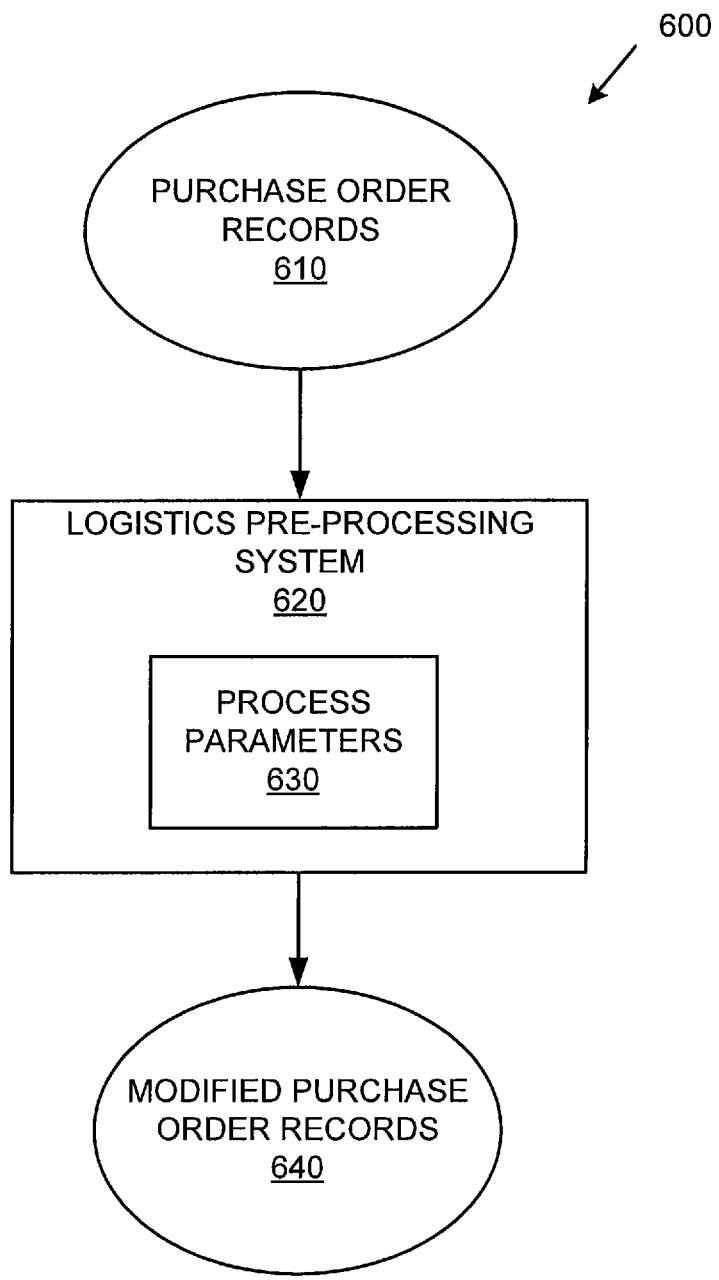
FIG. 6 is a block diagram of an exemplary system for implementing logistics pre-processing with process parameters.

FIG. 6 is a block diagram of an exemplary system 600 for implementing logistics pre-processing with process parameters. The system 600 and variants of it can be used for performing any of the methods described herein.

In the example, the logistics pre-processing system 620 is configured to accept purchase order records 610. The purchase order records 610 can be based on purchase orders submitted by one or more buyer agents, for example. The purchase order records 610 are processed according to the process parameters 630. For example, the purchase order records 610 can be processed to identify opportunities for shipment consolidation or to determine compatible purchase order records.

The logistics pre-processing system 620 is configured to generate modified purchase order records 640. Modified purchase order records 640 are typically characterized by a reduction in transportation cost relative to transportation costs associated with input purchase order records 610. For example, modified purchase order records 640 can result in a lower number of LTL shipments than the purchase order records 610 when processed by a load building processor such as a transportation management system. Modified purchase order records 640 can be generated by the logistics pre-processing system 620 by changing a date associated with one or more purchase order records 610. Modified purchase order records 640 can be submitted to a supplier or input into a transportation management system or other load building system, for example.

In practice, the system 600 can be more complicated, with additional inputs, outputs, and the like.

Example 15

Exemplary Method of Purchase Order Record Pre-Processing

Figure 7:
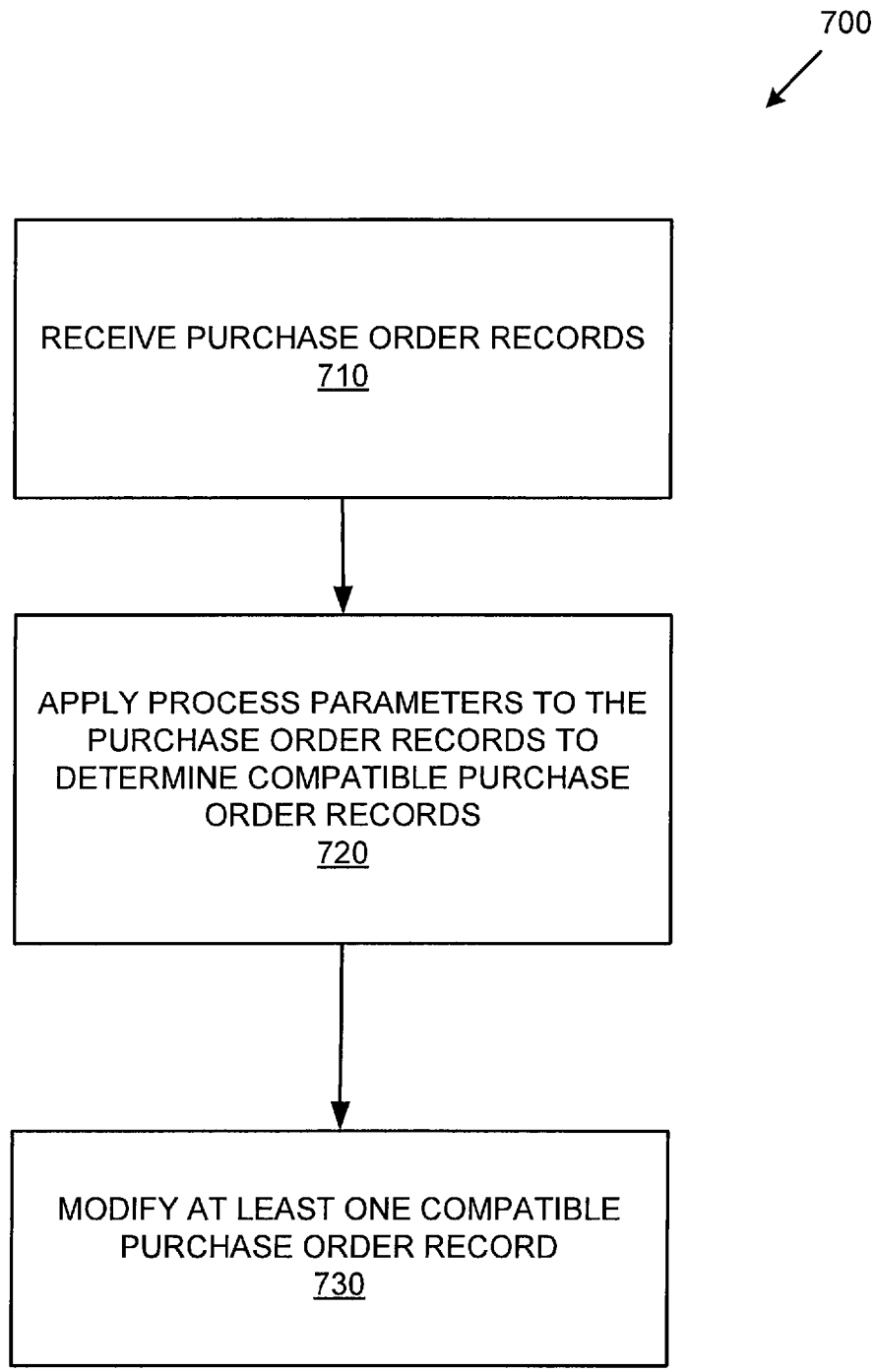
FIG. 7 is a flowchart of an exemplary method of purchase order record pre-processing via process parameters.

FIG. 7 is a flowchart of an exemplary method 700 of purchase order record pre-processing to consolidate shipments via process parameters. Method 700 and variants of it can be used in the examples described herein.

At 710, purchase order records are received.

At 720, process parameters are applied to the purchase order record to determine compatible purchase order records. For example, the identifying can include identifying purchase order records that are associated with shipments that can be combined or consolidated and determining a suggested modification.

At 730, at least one of the compatible purchase order records is modified. For example, a target ship date of the at least one of the compatible purchase order records can be changed to be the same as a target ship date of another compatible purchase order record. The modifying can be based on authorization from a user (e.g., of a suggested modification) or the modifying can be performed automatically. Results from the modifying can be displayed for the user such as by displaying the modified purchase order records to a user.

The described actions can be performed by a logistics pre-processing system or other system.

Example 16

Exemplary Method of Purchase Order Record Pre-Processing

Figure 8:
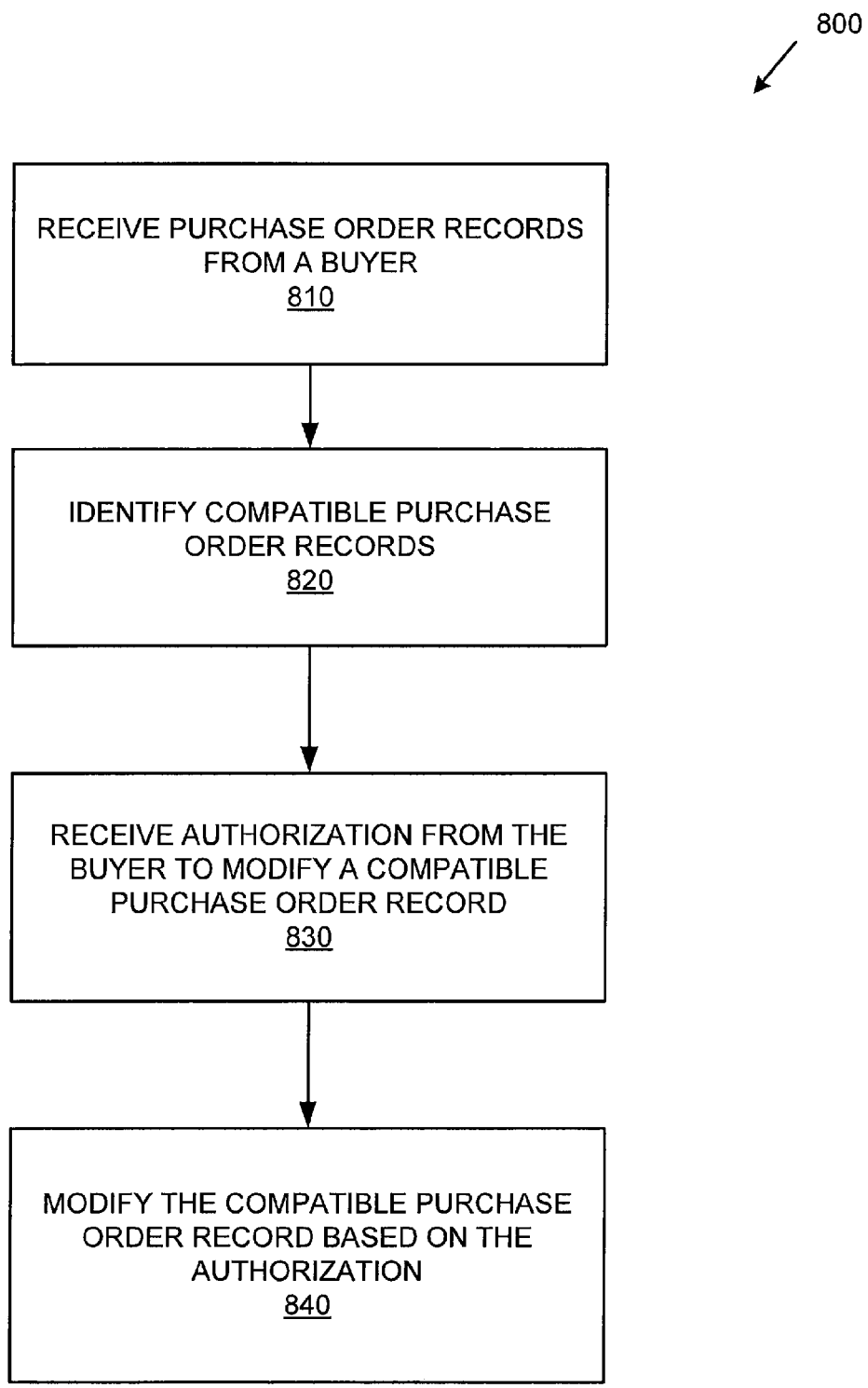
FIG. 8 is a flowchart of an exemplary method of purchase order record pre-processing, identifying compatible purchase order records, and receiving buyer authorization.

FIG. 8 is a flowchart of an exemplary method 800 of purchase order record pre-processing, identifying compatible purchase order records, and receiving buyer authorization. Method 800 and variants of it can be used in any of the examples described herein.

At 810, purchase order records are received from a buyer (e.g., from one or more buyer agents of the buyer).

At 820, compatible purchase order records are identified. The identifying can include determining that at least one of the compatible purchase order records has a target ship date and one or more others of the compatible purchase order records has a different target ship date. The identifying can include processing the purchase order records using process parameters (e.g., determining the two dates are within a limit).

At 830, authorization to modify a compatible purchase order record is received from the buyer. For example, authorization to change the target ship date of at least one of the compatible purchase order records to a different target ship date can be received. Such authorization can be received electronically (e.g., via a computer user interface) and can be responsive to a suggested modification routed to the buyer. The purchase order records can be associated with respective buyer agents (e.g., the agent who submitted the purchase order). Subsequently, a suggested modification can be routed to the respective buyer agent for authorization.

At 840, responsive to receiving authorization, the compatible purchase order record is modified (e.g., an acceptance is received). For example, target ship dates of compatible purchase order records can be modified (e.g., to have a same ship date) as described in any of the examples herein.

The described actions can be performed by a logistics pre-processing system or other system.

Example 17

Exemplary Process Parameters

In any of the examples herein, exemplary process parameters can include spatial process parameters, temporal process parameters, or both. Exemplary spatial process parameters can include spatial proximity parameters, spatial limit parameters, radial proximity parameters, radial limit parameters, and the like. A purchase order record can be processed using spatial process parameters based on spatial information of the purchase order record.

By processing purchase order records using a spatial process parameter, purchase order records can be grouped, selected, marked, or otherwise identified according to spatial information of the purchase order records. Groups of records satisfying spatial process parameters can be grouped together as compatible. For example, processing purchase order records according to a spatial process parameter such as a radial limit can identify those purchase order records having a supplier location within a radial distance (e.g., a distance or travel time threshold) from a specified location such as another supplier location, wherein the radial distance is determined based on the spatial process parameter. Such purchase order records can be identified as compatible. Spatial process parameters can specify that purchase order records having a same spatial property (e.g., zip code) are to be grouped together as compatible.

Exemplary temporal process parameters can include temporal proximity parameters, temporal limit parameters, days limit parameters, and the like. A purchase order record can be processed using temporal process parameters based on temporal or time-based information of the purchase order record.

By processing purchase order records using a temporal process parameter, purchase order records can be grouped, selected, marked, or otherwise identified according to time-based information of the purchase order records. Groups of records satisfying temporal process parameters can be grouped together as compatible. Processing purchase order records according to a temporal process parameter such as a days limit can identify those records having a target ship date within a timeframe of a particular date, wherein the timeframe is specified by the days limit. Such purchase order records can be identified as compatible. For example, processing purchase order records according to respective requested dates and a days limit parameter of plus or minus n days (e.g., one day), can identify those purchase order records having requested dates that are within n days of each other.

Compatible purchase order records can be consolidated and associated with potential consolidated shipments. A number of potential consolidated shipments can be increased by applying both temporal and spatial process parameters to purchase order records. Temporal and spatial process parameters can be applied sequentially or concurrently to purchase order records using methods and systems described herein. Purchase order records that have been identified based on processing according to process parameters can be identified as compatible purchase order records.

Example 18

Exemplary Supplier-to-Buyer Transportation in a Supply Chain

Figure 9:
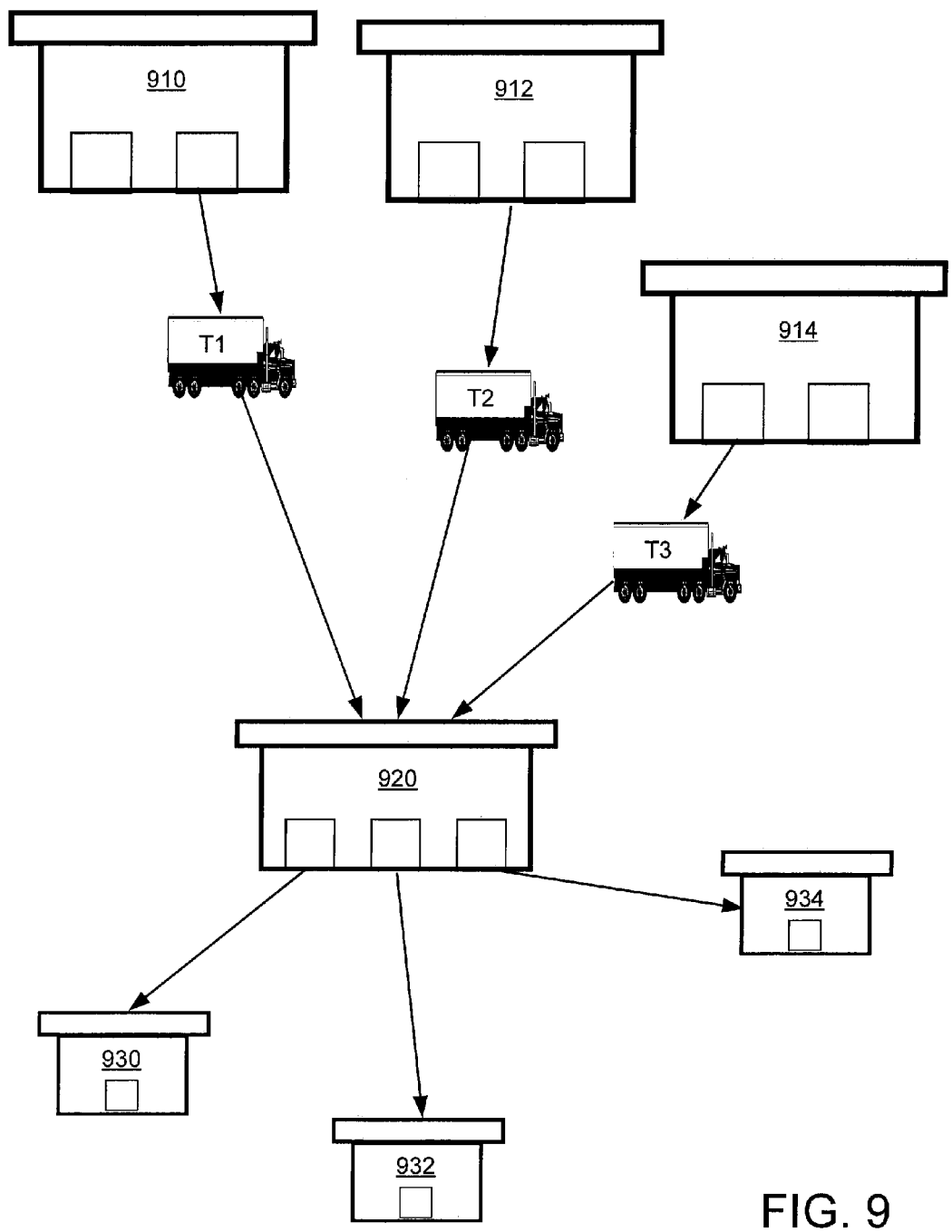
FIG. 9 is a block diagram of exemplary supplier-to-buyer transportation in a supply chain.

FIG. 9 is a block diagram of exemplary supplier-to-buyer transportation of shipments in a supply chain. In a supply chain, ordered goods can be transported such as in truckload shipments T1, T2, T3 from respective suppliers 910, 912, 914 to a buyer location 920 such as a retailer distribution center or warehouse. Such shipments from a supplier to a buyer can be referred to as inbound shipments. Truckload shipments T1, T2, T3 can be based on purchase order records submitted by the buyer to the respective suppliers.

Ordered goods can also be transported from the buyer location 920 to individual stores 930, 932, 934 for sale to a customer of the buyer. Such shipments from a buyer location to individual stores can be referred to as outbound shipments.

In practice, the supplier-to-buyer transportation in a supply chain can be more complicated, such as with additional buyers, suppliers, buyer locations, supplier locations, stores, and intermediaries.

Example 19

Exemplary Shipment Consolidation

FIG. 10 is a block diagram of exemplary consolidation of shipments. In a diagram 1000, potential shipments T1, T2, T3, T4, T5 associated with purchase order records submitted by a Buyer Agent 1 and a Buyer Agent 2 are displayed according to a respective requested ship date during a planning stage of the supply chain process. The requested ship dates are indicated as relative dates. In the diagram 1000, the potential shipments T1, T2, T3, T4, T5 represent LTL shipments that would ship on different dates because the requested ship dates are different.

In the example, the purchase order records associated with potential shipments T1, T2, T3, T4, T5 are pre-processed in order to identify opportunities to consolidate shipments. For example, the purchase order records can be processed according to technologies described herein. The identified consolidation opportunities are illustrated by the arrows in diagram 1000. The purchase order record requested ship dates are then modified before the shipments are realized to take advantage of the potential consolidation opportunities. In practice, the potential shipments need not be represented explicitly (e.g., target ship dates in purchase order records imply the shipments).

Diagram 1010 displays consolidated shipments associated with the modified purchase order records after pre-processing. In diagram 1010, potential shipments T1, T3, T5 have been consolidated into shipment T2 and shipment T4 remains unconsolidated. In order to consolidate potential shipments T1, T3, T5 into shipment T2, respective requested ship dates were modified to be the same as the ship date of potential shipment T2.

In this example, five potential LTL shipments before pre-processing were consolidated into two shipments after pre-processing. Reducing the number of shipments can reduce transportation costs.

Example 20

Exemplary Method of Purchase Order Record Pre-Processing

Figure 11:
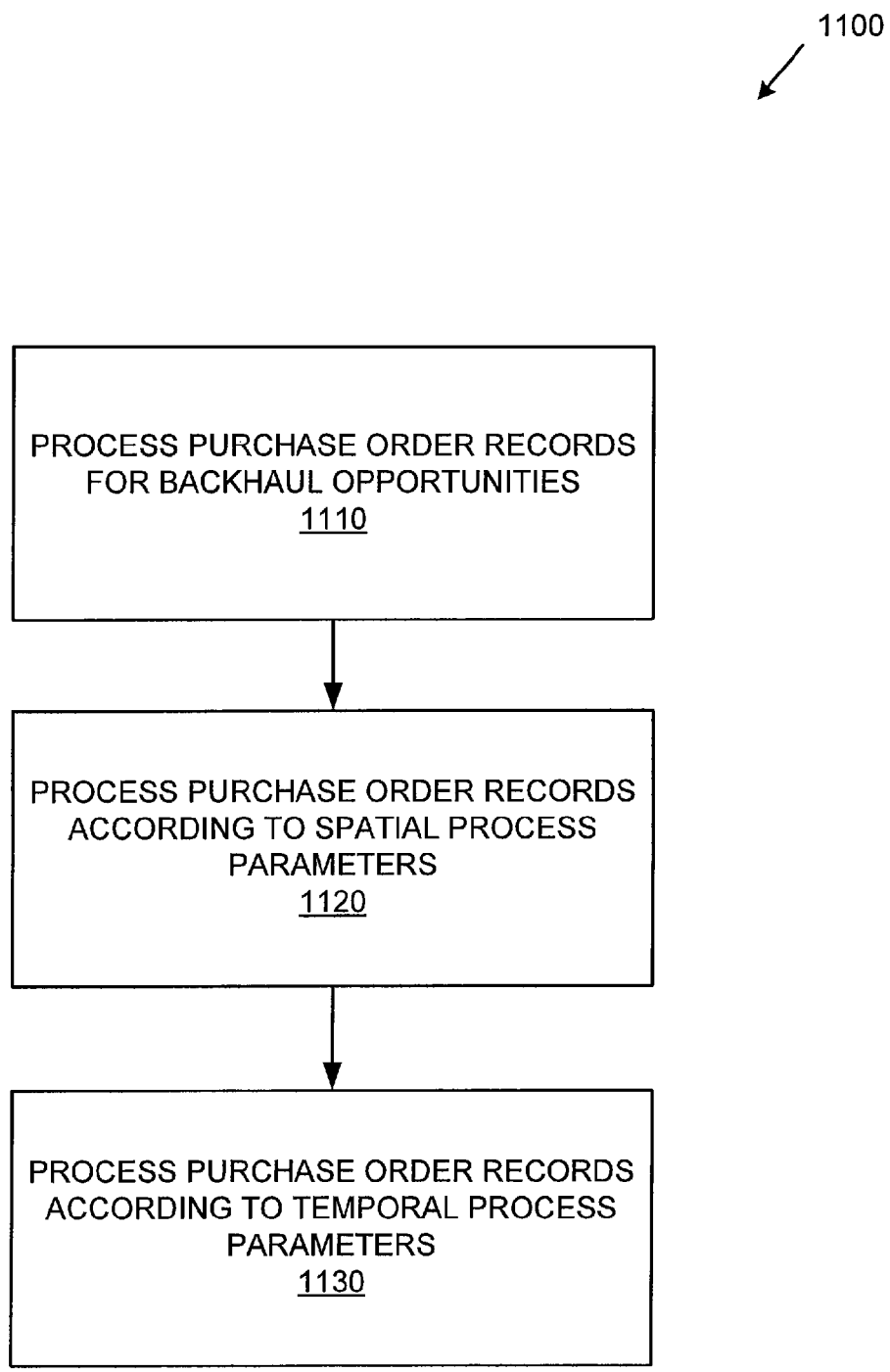
FIG. 11 is a flowchart of an exemplary method of purchase order record pre-processing with backhaul processing, processing according to spatial process parameters, and processing according to temporal process parameters.

FIG. 11 is a flowchart of an exemplary method 1100 of purchase order record pre-processing with backhaul processing, processing according to spatial process parameters, and processing according to temporal process parameters. Method 1100 and variants of it can be used in the examples described herein.

At 1110, purchase order records are processed to identify backhaul opportunities for shipment consolidation. For example, opportunities for consolidation of outbound shipments with inbound shipments can be identified.

At 1120, purchase order records are processed according to spatial process parameters to identify opportunities for inbound shipment consolidation. For example, spatial compatible purchase order records can be identified.

At 1130, purchase order records are processed according to temporal process parameters to identify opportunities for inbound shipment consolidation. For example, temporally compatible purchase order records can be identified.

The described actions can be performed by any of the pre-processing systems described herein, a combination of pre-processing systems, or another system.

Example 21

Exemplary Backhaul Pre-Processing System

Figure 12:
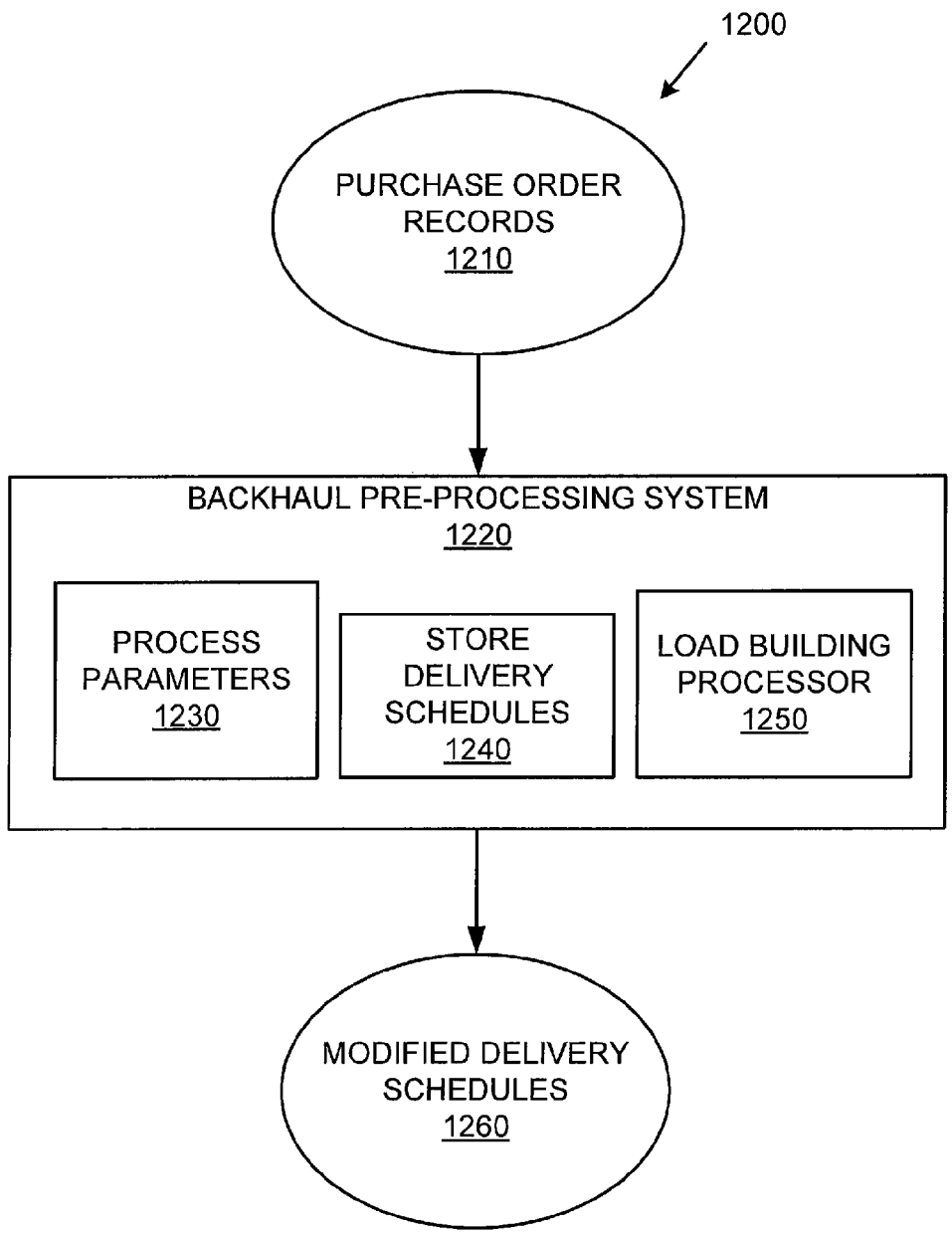
FIG. 12 is a block diagram of an exemplary backhaul pre-processing system.

FIG. 12 is a block diagram of an exemplary system 1200 implementing a backhaul pre-processing system 1220.

The backhaul pre-processing system 1220 receives purchase order records 1210. The backhaul pre-processing system 1220 is configured to process the purchase order records 1210 based on process parameters 1230 and store delivery schedules 1240. The store delivery schedules 1240 can represent scheduled outbound shipments from a buyer location (e.g., a warehouse) to stores. The backhaul pre-processing system 1220 can optionally include a load building processor 1250 which can organize shipments associated with the purchase order records 1210 based on the processing.

The backhaul pre-processing system 1220 is configured to generate modified delivery schedules 1260. The modified delivery schedules 1260 can include store delivery schedules combined with backhaul opportunities (e.g., inbound deliveries). For example, the backhaul pre-processing system 1220 can be configured to identify compatible purchase order records having locations within spatial proximity limits of a store, target ship dates within temporal proximity limits of a respective delivery schedule, or both. Shipments associated with the identified compatible purchase order records can be combined with deliveries on the delivery schedule to take advantage of the identified backhaul opportunities (e.g., thereby reducing the number of LTL shipments). For example, a modified delivery schedule can indicate that one or more inbound shipments associated with purchase order records are to be consolidated with outbound shipments described by delivery schedules. The backhaul pre-processing system 1220 can be configured to modify purchase order record target ship dates (e.g., delivery dates) in order to consolidate shipments, and modifications can be made automatically or based on a user input.

The backhaul pre-processing system 1220 can be used in combination or in parallel with other pre-processing systems described herein.

Example 22

Figure 13:
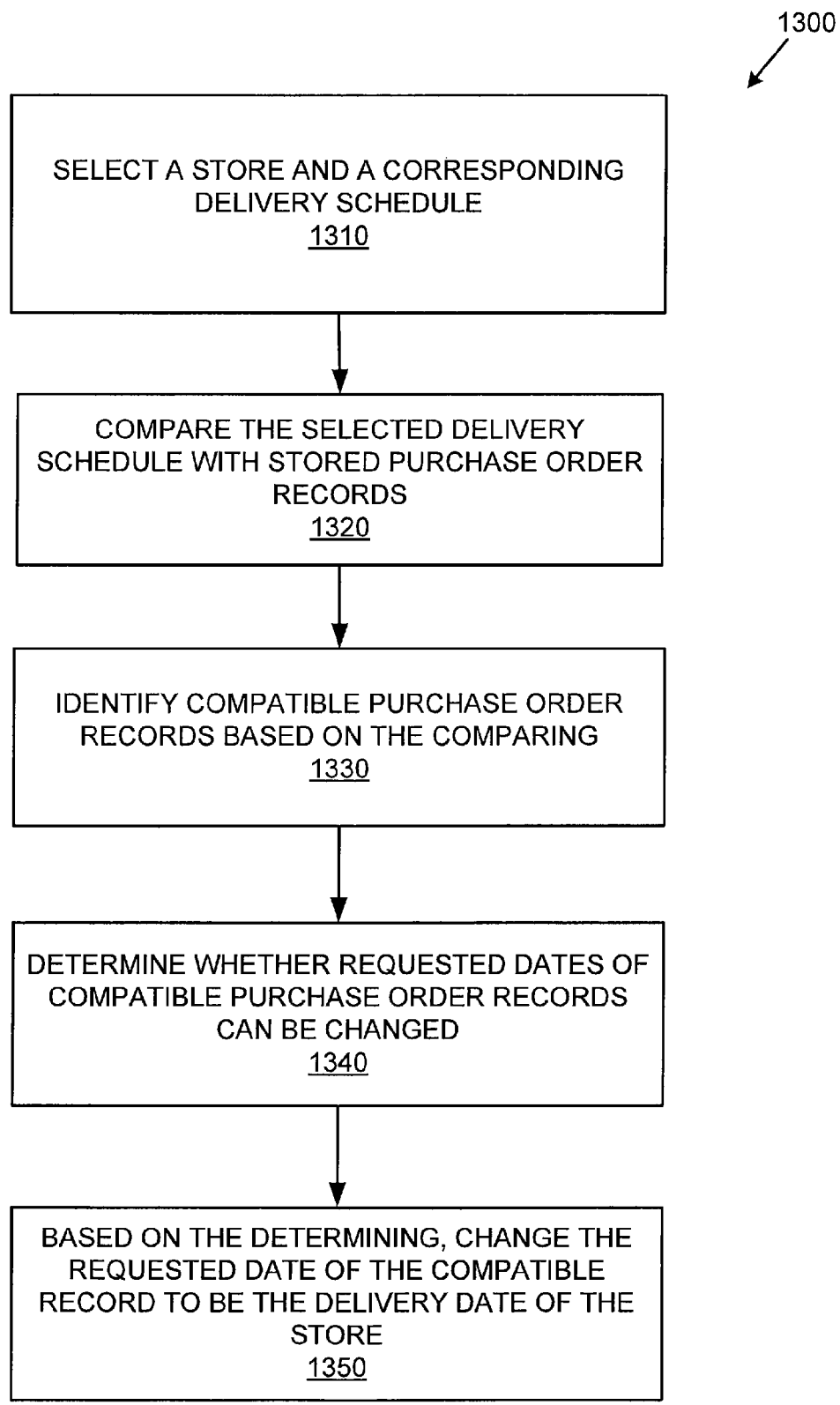
FIG. 13 is a flowchart of an exemplary method of modifying a purchase order record based on a store delivery schedule with backhaul processing.

Exemplary Method of Modifying a Purchase Order Record Based on a Store Delivery Schedule with Backhaul Processing FIG. 13 is a flowchart of an exemplary method 1300 of modifying a purchase order record based on a store delivery schedule with backhaul processing, and can be used in any of the examples herein.

At 1310, a store and a corresponding delivery schedule are selected. For example, the store can be selected from a list of stores and corresponding delivery schedules. The selected store has a store location and a delivery date associated with an outbound shipment to the store. The stores can be any destination for outbound shipments from a buyer location, wherein the delivery schedules describe transportation logistics of the outbound shipments to the stores.

At 1320, the selected delivery schedule is compared to stored purchase order records. The store location and delivery date of the selected store can be compared with locations and requested dates, respectively, of stored purchase order records. For example, the comparing can be based on spatial and temporal process parameters. A requested date can be a target ship date (e.g., a delivery or ship date) requested by a buyer and a location of a stored purchase order record can be a vendor location.

At 1330, purchase order records that are compatible with the selected store are identified based on the comparing. The identifying can be based on spatial and temporal proximity parameters used in the comparing. For example, purchase order records associated with a vendor location within a same zip code as the store, having a target ship date within n days (e.g., one or the like) of the store delivery date, or both, can be identified as compatible purchase order records.

At 1340, for a compatible purchase order record, it is determined whether a corresponding requested date can be changed. The determining can be based on, for example, a purchase order record status, a modification cut-off date, or both. For example, purchase order records associated with a "must-go" shipment (e.g., those purchase order records whose dates cannot be changed or whose shipments cannot be delayed) can be identified as not changeable.

At 1350, based on the determining, the requested date of the compatible purchase order record is changed to the delivery date of the store. The changing of the requested date of the compatible purchase order record can be based on input from a user. As a result of the changing, a modified delivery schedule can be produced. The modified delivery schedule can indicate shipments associated with compatible purchase order records (e.g., inbound shipments) that can be consolidated with store delivery shipments (e.g., outbound shipments) of a corresponding store delivery schedule.

Method 1300 can be repeated for a list of stores, delivery schedules, or both, and actions 1340 and 1350 can be repeated for other compatible purchase order records. Method 1300 can be performed by the backhaul pre-processing system 1220 or by other pre-processing systems described herein. Method 1300 can be used, for example, by a buyer to optimize outbound transportation and to take advantage of backhaul opportunities.

Example 23

Exemplary Load Building Processor

In any of the examples described herein, an exemplary load building processor can organize goods (e.g., ordered goods) to be transported from a supplier to a buyer into shipments such as truckloads or other appropriate shipping units according to preset load building parameters. Load building processors can use standard load building and truck routing algorithms. A transportation management system is an example of a load building processor. A load building processor processes purchase order records to generate and organize shipments associated with the purchase order records.

Load building can be based on the following parameters in addition to other parameters: shipment size (e.g., weight, volume, and pallets), merchandize class (e.g., perishable, non-perishable, hazardous material, etc.), equipment type (e.g., refrigerated or ambient), shipping unit capacity (e.g., a threshold such as a weight or volume limit), and merchandize compatibility (e.g., co-mingling of merchandize or goods).

The following table, Table 1, is an example of a load building routine. In the example, purchase records are arranged according to vendor location and according to weight. Records with a vendor location that is farthest from a buyer receiving warehouse are processed first and remaining records are then processed progressively towards the receiving warehouse. Shipments associated with the purchase records can be cubed according to size and assigned to a shipping unit. When the shipping unit is full (e.g., a weight or volume limit has been reached) or can no longer be assigned any shipments, the loading building routine stops and begins assigning shipments to another shipping unit.

TABLE 1

| Sl. No. | Rec Whse Code | PO Original Ship Date | PO Current Ship Date | PO Suggested Ship Date | Vendor Zip Code | Vendor Code | PO Line # Weight (in TL) | Store Route # | Product Compatibility |
|---|---|---|---|---|---|---|---|---|---|
| 1 | 5631 | 15 Jun. 2007 | 15 Jun. 2007 | 17 Jun. 2007 | 2149 | 001 | 0.9 | S1 | Yes |
| 2 | 5631 | 15 Jun. 2007 | 15 Jun. 2007 | 17 Jun. 2007 | 2149 | 001 | 0.8 | S2 | Yes |
| 3 | 5631 | 15 Jun. 2007 | 15 Jun. 2007 | 17 Jun. 2007 | 2149 | 001 | 0.7 | S3 | Yes |
| 4 | 5631 | 15 Jun. 2007 | 15 Jun. 2007 | 17 Jun. 2007 | 2149 | 001 | 0.7 | S4 | Yes |
| 5 | 5631 | 15 Jun. 2007 | 15 Jun. 2007 | 17 Jun. 2007 | 2149 | 001 | 0.6 | S5 | Yes |
| 6 | 5631 | 15 Jun. 2007 | 15 Jun. 2007 | 17 Jun. 2007 | 2149 | 001 | 0.3 | S3 | Yes |
| 7 | 5631 | 15 Jun. 2007 | 15 Jun. 2007 | 17 Jun. 2007 | 2149 | 001 | 0.2 | S2 | Yes |
| 8 | 5631 | 15 Jun. 2007 | 15 Jun. 2007 | 17 Jun. 2007 | 2149 | 001 | 0.1 | S1 | Yes |
| 9 | 5631 | 15 Jun. 2007 | 15 Jun. 2007 | 17 Jun. 2007 | 2149 | 001 | 0.1 | S4 | Yes |

Example 24

Exemplary Pre-Processing System with Spatial Process Parameters

Figure 14:
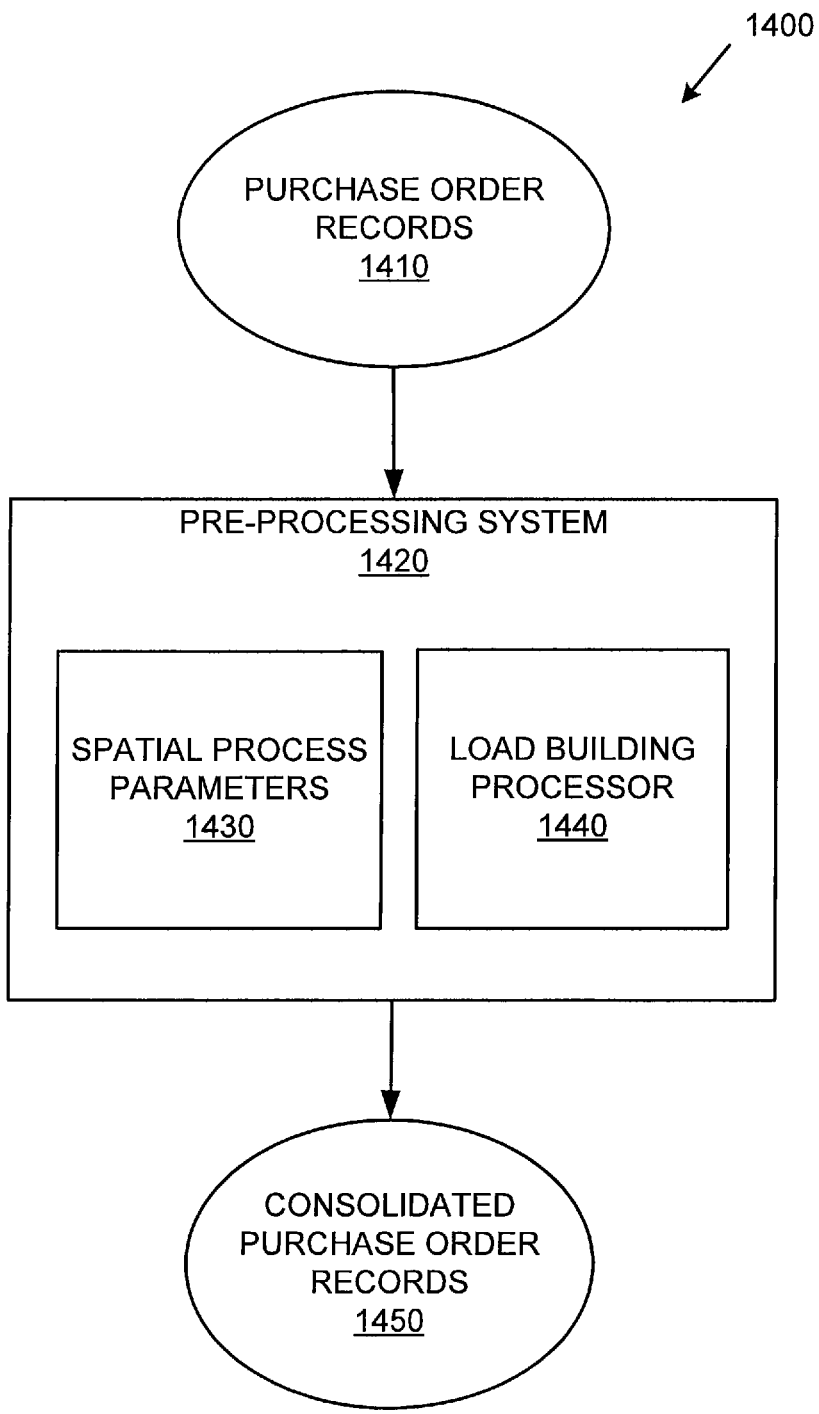
FIG. 14 is a block diagram of an exemplary pre-processing system using spatial process parameters.

FIG. 14 is a block diagram of an exemplary system 1400 implementing a pre-processing system 1420 using spatial process parameters 1430.

The pre-processing system 1420 receives purchase order records 1410. The pre-processing system 1420 is configured to process the purchase order records 1410 based on spatial process parameters 1430. The pre-processing system 1420 can optionally include a load building processor 1440 which can organize shipments associated with the purchase order records 1410 based on the processing.

The pre-processing system 1420 provides consolidated purchase order records 1450.

The pre-processing system 1420 can be used in combination or in parallel with any of the other systems described herein.

Example 25

Exemplary Method of Pre-processing Based on Spatial Process Parameters

Figure 15:
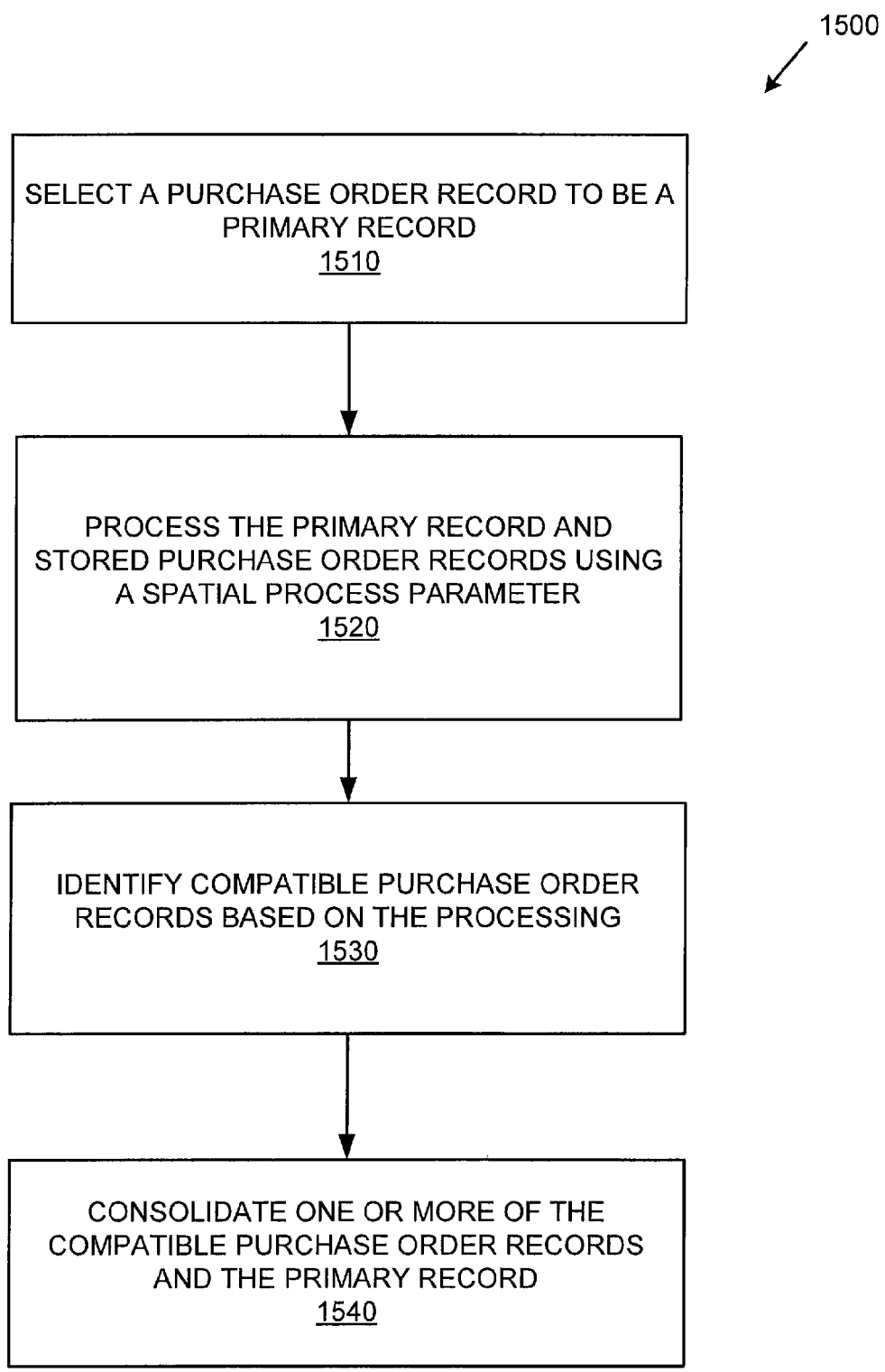
FIG. 15 is a flowchart of an exemplary method of pre-processing based on spatial process parameters.

FIG. 15 is a flowchart of an exemplary method 1500 of pre-processing purchase order records based on spatial process parameters, and can be used in any of the examples herein.

At 1510, a purchase order record is selected such as from a list of purchase order records to be a primary purchase order record. For example, the purchase order record can be selected based on a distance between a buyer receiving warehouse location and a vendor shipping warehouse location associated with respective purchase order records in the list.

At 1520, the primary purchase order record and stored purchase order records are processed based on spatial process parameters. For example, a vendor location associated with the primary purchase order record can be compared to vendor locations of the stored purchase order records based on a spatial proximity parameter.

At 1530, compatible purchase order records are identified based on the processing. The compatible purchase order records can be identified from the stored purchase order records and the identifying can be based on the spatial process parameters used in the processing. For example, purchase order records that are compatible with the primary purchase order record can be identified based on the comparing of vendor locations. For example, purchase order records associated with a vendor location within a same zip code as the vendor location associated with the primary purchase order record can be identified as spatially compatible purchase order records.

At 1540, one or more of the compatible purchase order records are consolidated with the primary purchase order record. As a result, shipments associated with the compatible purchase order records and the primary purchase order record can be consolidated such as through processing of the consolidated purchase order records by a load building processor.

Method 1500 can be performed by a pre-processing system 1420 or by other pre-processing systems described herein. Method 1500 can be used, for example, by a retailer or a buyer to optimize inbound transportation.

Example 26

Exemplary Pre-Processing System using Temporal Process Parameters

Figure 16:
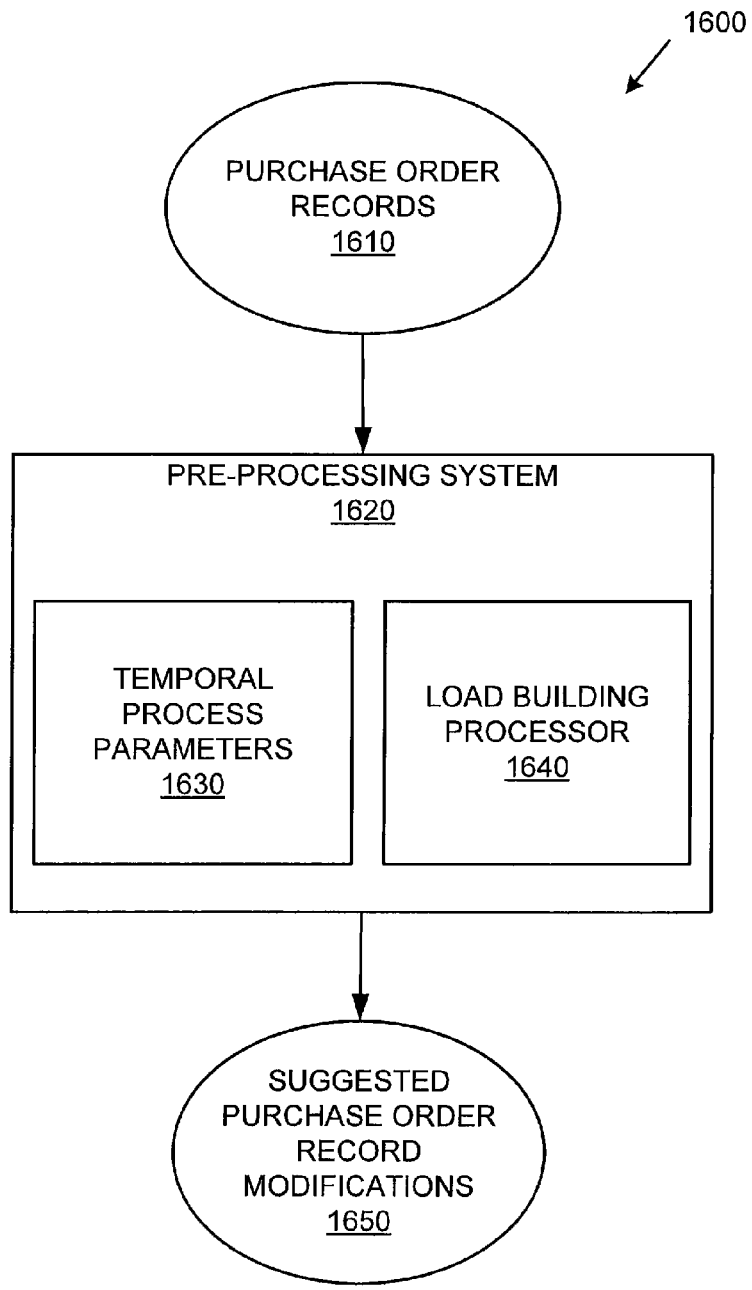
FIG. 16 is a block diagram of an exemplary pre-processing system using temporal process parameters.

FIG. 16 is a block diagram of an exemplary system 1600 implementing a pre-processing system 1620 with temporal process parameters 1630.

The pre-processing system 1620 receives purchase order records 1610. The pre-processing system 1620 is configured to process the purchase order records 1610 based on temporal process parameters 1630. The pre-processing system 1620 can optionally include a load building processor 1640 which can organize shipments associated with purchase order records based on the processing.

The pre-processing system 1620 provides suggested purchase order record modifications 1650. The suggested purchase order record modifications 1650 can be, for example, a suggested change to a delivery or shipping date of a purchase order record. The pre-processing system 1620 can be further configured to perform the suggested modification either automatically or based on a user input.

The pre-processing system 1620 can be used in combination or in parallel with other pre-processing systems described herein. For example, the pre-processing system 1620 can be combined with a pre-processing system 1420 to process purchase order records according to both spatial and temporal process parameters.

Example 27

Exemplary Method of Pre-Processing Based on Temporal Process Parameters

Figure 17:
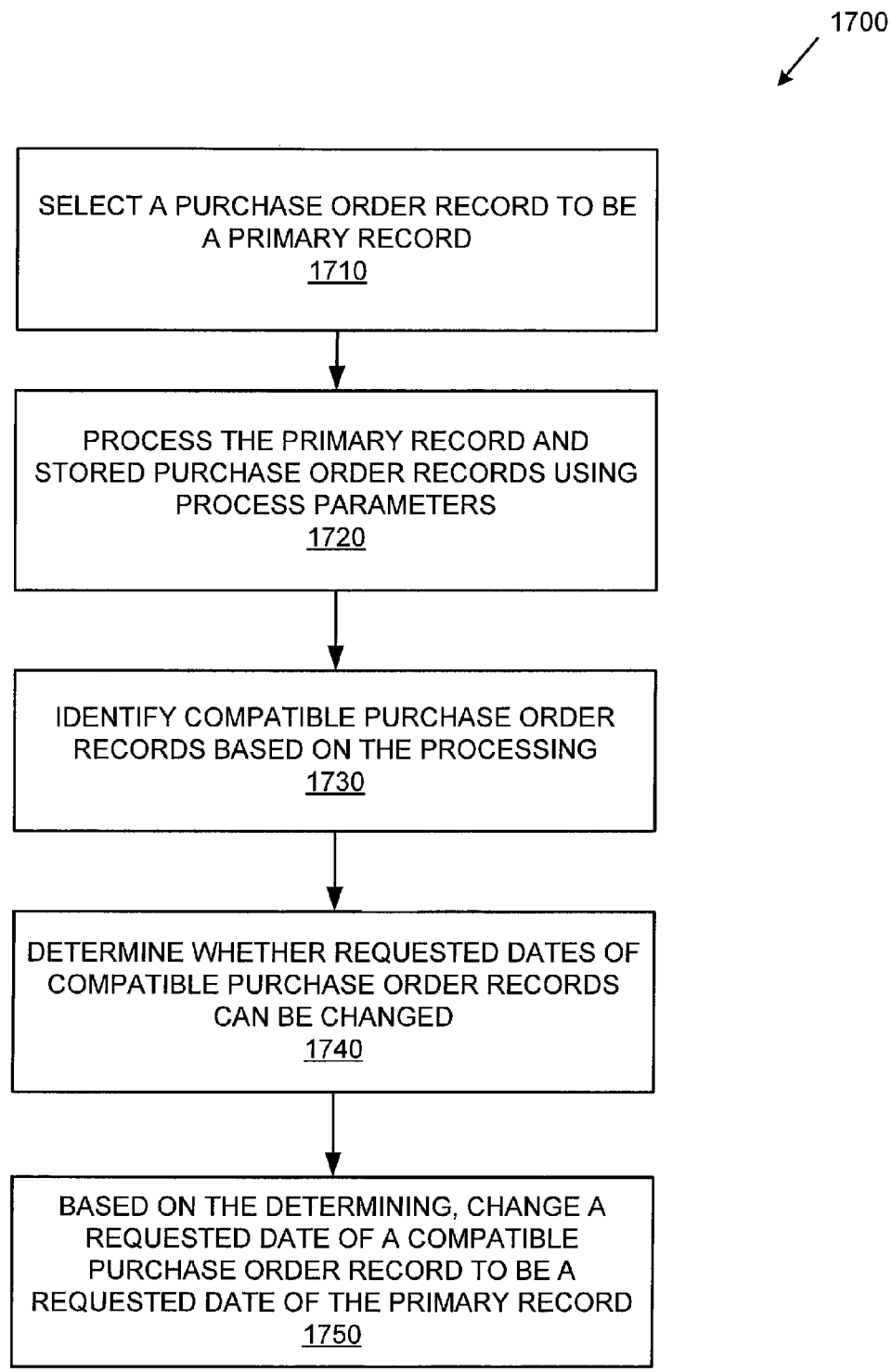
FIG. 17 is a flowchart of an exemplary method of pre-processing based on temporal process parameters to change a requested date of a purchase order record.

FIG. 17 is a flowchart of an exemplary method 1700 of pre-processing purchase order records based on temporal process parameters, and can be used in any of the examples herein.

At 1710, a purchase order record is selected (e.g., from a list of purchase order records) to be a primary purchase order record. The primary purchase order record has a requested date (e.g., original target ship date) and is associated with a first vendor location. The requested date can be a target ship date (e.g., delivery or ship date) requested by a buyer. The primary purchase order record can be selected based on the requested date, based on a distance between a buyer receiving warehouse location and a vendor shipping warehouse location associated with the purchase order record, or based on both.

At 1720, the primary purchase order record and other purchase order records (e.g., stored purchase order records) are processed based on process parameters. The purchase order records can be processed based on temporal process parameters or based on temporal and spatial process parameters. For example, the requested date and a vendor location associated with the primary purchase order record can be compared with requested dates and vendor locations of stored purchase order records based on temporal and spatial process parameters.

At 1730, compatible purchase order records are identified based on the processing. The identifying can be based on temporal process parameters or based on temporal and spatial process parameters used in the comparing. The identifying can include identifying purchase order records that are compatible with the primary purchase order record based on comparing of vendor locations and requested dates. For example, purchase order records having a vendor location within a same zip code or within a pre-determined distance of the vendor location associated with the primary purchase order record, or having a requested date within n days (e.g., one day or other predetermined timeframe) of the requested date of the primary purchase order record can be identified as compatible purchase order records.

At 1740, it is determined whether requested dates of compatible purchase order records can be changed. The determining can be based on, for example, a purchase order record status, a modification cut-off date, or both. For example, purchase order records associated with a "must-go" shipment (e.g., those purchase order records whose dates cannot be changed or whose shipments cannot be delayed) can be identified as not changeable.

At 1750, based on the determining, a requested date of at least one compatible purchase order record is changed to the requested date of the primary purchase order record. The changing of the requested date of the compatible purchase order record can be based on input received from a user.

Method 1700 can be performed by a pre-processing system such as system 1600 or by other pre-processing systems described herein. Method 1700 can be used, for example, to optimize inbound transportation of a retailer or buyer.

Example 28

Exemplary Method of Pre-Processing Based on Temporal Process Parameters

Figure 18:
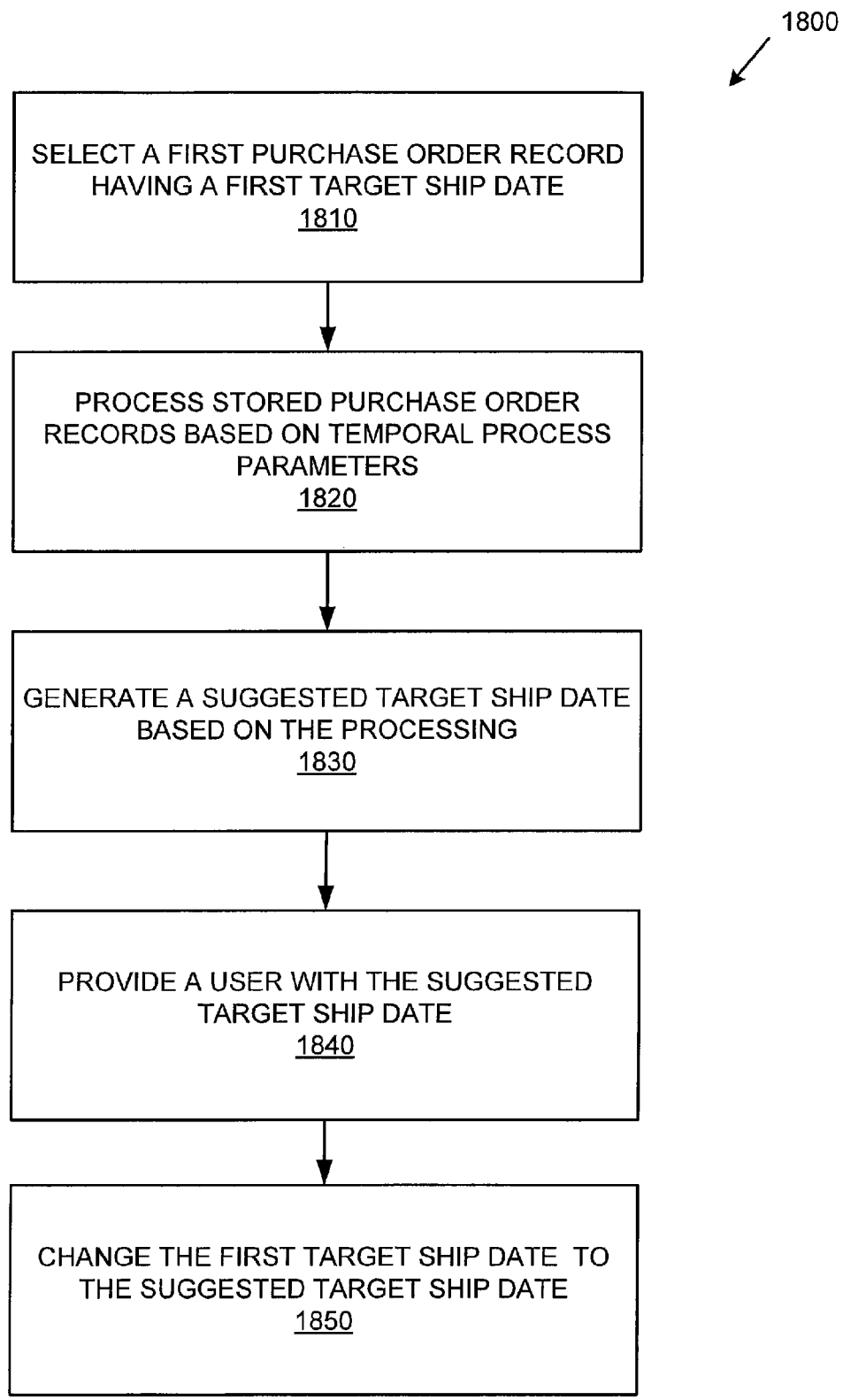
FIG. 18 is a flowchart of an exemplary method of pre-processing based on temporal process parameters to generate a suggested target ship date.

FIG. 18 is a flowchart of an exemplary method 1800 of pre-processing purchase order records based on temporal process parameters, and can be used in any of the examples herein.

At 1810, a first purchase order record having a first requested date is selected such as from a list of stored purchase order records. The first request date can be an original target ship date.

At 1820, the first purchase order record and other purchase order records (e.g., the stored purchase order records) are processed based on temporal process parameters.

At 1830, a suggested target ship date is generated based on the processing. For example, the processing can include identifying compatible purchase order records and the suggested target ship date can be a target ship date of one or more of the identified compatible purchase order records.

At 1840, a user is provided with the suggested target ship date. For example, the providing can include displaying the suggested target ship date for the user and requesting authorization from the user to modify the first purchase order record to have the suggested target ship date. The user can be a buyer agent that submitted the first purchase order record.

At 1840, the first target ship date is changed to the suggested target ship date. The changing can be based on authorization from the user.

Method 1800 can be performed by a pre-processing system such as system 1600 or by other pre-processing systems described herein. Method 1800 can be used, for example, to optimize inbound transportation of a retailer or buyer.

Example 29

Exemplary Method of Pre-Processing Based on Temporal Process Parameters

Figure 19:
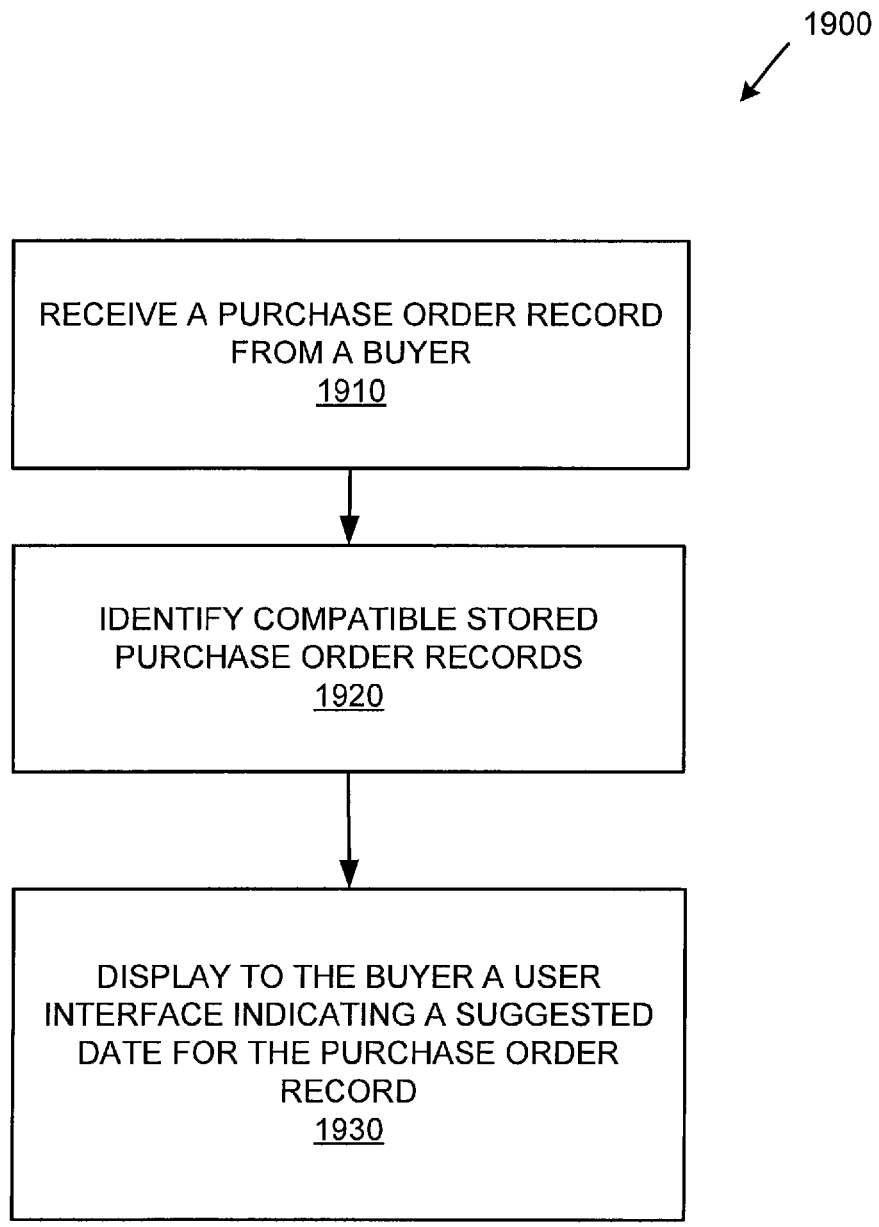
FIG. 19 is a flowchart of an exemplary method of pre-processing based on temporal process parameters to display a suggested date to a user.

FIG. 19 is a flowchart of an exemplary method 1900 of pre-processing purchase order records based on temporal process parameters, and can be used in any of the examples herein.

At 1910, a purchase order record is received from a buyer agent of a buyer, the purchase order record having a requested date and being associated with at least one vendor. The requested date can be stored as a target ship date. The receiving can include storing an association between the purchase order record and the buyer agent that placed a purchase order generating the purchase order record.

At 1920, before the purchase order record is released by the buyer, one or more stored purchase order records are identified as compatible with the purchase order record. The identifying can include processing the purchase order record and the one or more stored purchase order records according to process parameters.

At 1930, a user interface is displayed to the buyer agent indicating a suggested date for the purchase order record that is different from the requested date, wherein the suggested date is determined based on the identifying (e.g., the suggested date can be a target ship date of a compatible purchase order record). The user interface can be limited to those purchase order records associated with the buyer agent to whom the user interface is displayed. Authorization from the buyer agent to change the requested date to the suggested date can be received via the user interface.

Method 1900 can be performed by a pre-processing system such as system 1600 or by other pre-processing systems described herein. Method 1900 can be used, for example, to optimize inbound transportation of a retailer or buyer.

Example 30

Exemplary Method of Changing a Target Ship Date Based on Feedback

Figure 20:
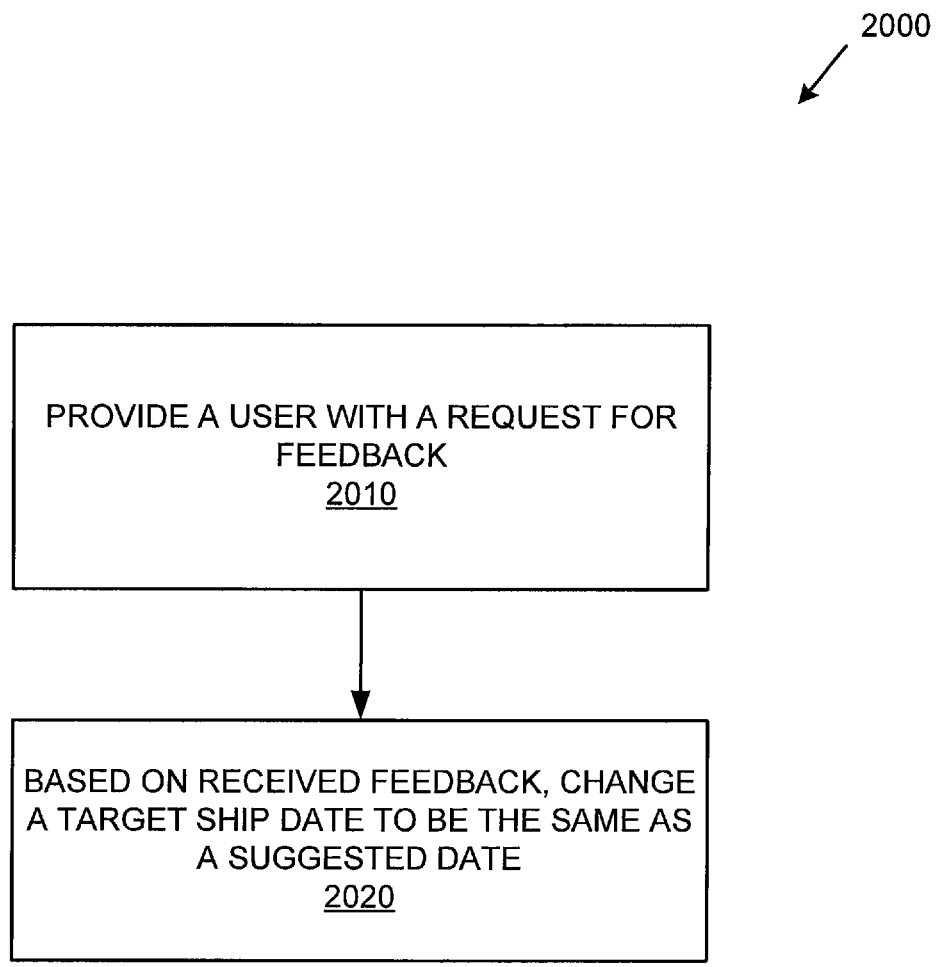
FIG. 20 is a flowchart of an exemplary method of changing a target ship date based on feedback.

FIG. 20 is a flowchart of an exemplary method 2000 of changing a target ship date based on feedback, and can be used in any of the examples herein.

At 2010, a request for feedback is provided to a user. For example, a request for authorization can be provided to the user. The providing can include displaying a user interface to the user, wherein the user interface indicates purchase order records having a suggested date that is not the same as an original target ship date.

At 2020, based on feedback received from the user, the target ship date is changed to be the same as the suggested date. For example, the user can indicate through the user interface that a suggested date is to be accepted. The date on the purchase order record is then updated based on input from the user.

Method 2000 can be used to in addition to or combined with other methods and systems described herein.

Example 31

Exemplary User Interface

Figure 21:
FIG. 21 is a sample graphical user interface that can be used to input process parameters for purchase order pre-processing.

FIG. 21 is a sample graphical user interface 2110 for inputting process parameters for purchase order pre-processing. In general, the graphical interface 2110 can function as an activation screen for implementing purchase order record pre-processing by a user. For example, the user can input parameters and trigger the optimization process using the graphical interface. Input parameters can include load match parameters and cubing parameters. Load match parameters can include process parameters (e.g., a radial limit, a days limit, or both), a consolidation level, a indication to mix categories of goods, and a ship date limit. Cubing parameters can include a threshold limit, trailer capacity, and other parameters used by a load building processor.

The graphical user interface 2110 can be used, for example, with a user-implemented pre-processor. The graphical interface 2110 can be web-based and a user (e.g., a buyer agent) can login such as with a username and a password. In any of the examples herein, a user interface for inputting the parameters for purchase order record pre-processing (e.g., graphical user interfaces 2110) can be configured as a dashboard-like tool, as part of a web-based interface, web portal, or the like. Graphical user interface 2110 can include more or fewer fields than those shown in FIG. 21, as appropriate for a particular implementation.

Example 32

Exemplary User Interface

FIG. 22 is a sample graphical user interface 2210 for displaying results from purchase order record pre-processing with load building. The graphical interface 2210 can be web-based. In general, the graphical user interface 2210 displays input parameters and consolidation results. Input parameters can include process parameters used in the pre-processing such as a radial limit, a days limit, or both. Other pre-processing parameters include dates of purchase order records to be considered for pre-processing (i.e., process dates) and a type of consolidation such as inbound or outbound. Input parameters can also include cubing parameters, HOS parameters, and other parameters used for load building. The consolidation results can include lists of consolidated shipments, consolidated purchase order records, or both. The consolidation results can be for different scenarios (e.g., pre-processing based on different inputs, process parameters, or combinations of process parameters). The consolidation results can include potential savings and can include results from a "what-if" analysis (e.g., before purchase order records are actually modified or consolidated).

The graphical interface 2210 can function as an activation screen for implementing purchase order record pre-processing. For example, the user can enter input parameters using the graphical interface and shipment consolidation results can be displayed after the parameters are entered. Therefore, a graphical user interface such as graphical user interface 2210 can be used with a user-implemented pre-processor.

In any of the examples herein, a user interface for displaying results from purchase order record pre-processing (e.g., graphical user interface 2210) can be configured as a dashboard-like tool, as part of a web-based interface, a web portal, or the like. Graphical user interface 2210 can include more or fewer fields than those shown in FIG. 22, as appropriate for a particular implementation.

Example 33

Exemplary Implementation

In an exemplary implementation of a logistics pre-processor, purchase order records are pre-processed and consolidated based on vendor location and backhaul opportunities, according to spatial proximity parameters, and according to temporal proximity parameters. The purchase order record pre-processing can be implemented by a buyer, a buyer agent, or a third party, for example. In the implementation, buyers are referred to as retailers and suppliers are referred to as vendors.

In the implementation, purchase order records, store delivery schedules, and process parameters are input into the logistics pre-processor. Purchase order records are referred to in this implementation as purchase records and can be organized in a reference table such as Table 2. For example, lines in the reference table can represent a purchase record and can contain the following fields: original (or requested) delivery date, current delivery date, suggested delivery date, purchase record number, vendor location, vendor identification number, and status. In Table 2, dates are represented by days of the week. However, in the implementation, dates can be represented by a calendar date, relative date, or other representation of a date. The reference table can contain more or fewer fields as well as fields not described herein.

TABLE 2

| Vendor ID | Vendor Location Zip Code | Purchase Record # | Requested Delivery Date | Current Delivery Date | Suggested Delivery Date | Trailer Number | Status |
|---|---|---|---|---|---|---|---|
| 542 | 00001 | 131 | Monday | Monday | | | Blank |
| 234 | 00001 | 132 | Monday | Monday | | | Blank |
| 525 | 00002 | 133 | Monday | Monday | | | Blank |
| 247 | 00001 | 134 | Wednesday | Tuesday | | | A |
| 058 | 00002 | 135 | Tuesday | Tuesday | | | Blank |
| 547 | 00001 | 136 | Tuesday | Wednesday | | | A |
| 698 | 00001 | 137 | Wednesday | Wednesday | | | Blank |
| 357 | 00002 | 138 | Wednesday | Wednesday | | | Blank |
| 254 | 00001 | 139 | Thursday | Thursday | | | Blank |
| 525 | 00002 | 140 | Thursday | Thursday | | | Blank |

In the case of pre-processing based on backhaul opportunities, purchase records can be pre-processed and shipments can be consolidated based on store delivery schedules and vendor locations. For example, a retailer can deliver goods to several stores from a retailer warehouse according to a fixed or predetermined store delivery schedule. Goods can be delivered, for example, to the stores using a single truck that follows a pre-determined route, and the stores can each be assigned a stop along that route. A store delivery schedule can be a table such as Table 3 which lists the stores that the retailer supplies with goods and corresponding delivery information. Stores can correspond to respective lines in Table 3 and the table can include store delivery information such as store location, store identifier, delivery date, route identifier, and stop sequence. A store delivery schedule table can contain more or fewer fields as well as fields not described herein. In Table 3, dates are represented by days of the week. However, in the implementation, dates can be represented by calendar dates, relative dates, or other representations of a date.

TABLE 3

| Store Location Zip Code | Store | Delivery Date | Stop Sequence | Route Identifier |
|---|---|---|---|---|
| 00001 | A | Monday | 3 | M1 |
| 00001 | B | Wednesday | 1 | W1 |
| 00002 | C | Monday | 2 | M1 |
| 00002 | D | Monday | 1 | M1 |
| 00002 | E | Wednesday | 2 | W1 |

In the exemplary implementation, purchase records are processed according to process parameters. The process parameters include spatial and temporal process parameters as described herein. In the implementation, process parameters include a radial limit parameter and a days limit parameter. The radial limit parameter determines a physical region or spatial boundary within which vendor locations associated with compatible records are located. For example, a radial limit can be a zip code and compatible records are those records associated with vendor locations having the same zip code. A radial limit can also be a distance such as a number of miles between a retailer warehouse and a vendor warehouse. The days limit parameter determines a timeframe such as plus or minus n days and compatible records have delivery dates that are within the timeframe. The days limit is a number of days by which a purchase record delivery date can be postponed or advanced from an original delivery date.

Other process parameters in addition to temporal and spatial process parameters can be used in an implementation of a logistics pre-processor. For example, in the implementation, additional parameters include shipment transit time, order fulfillment time, vendor lead time, modification cut-off date, order transmit time, and purchase record status. Parameters such as shipment transit time, order fulfillment time, and vendor lead time can depend on a vendor associated with a purchase record and therefore need not be the same for all purchase records in a reference table.

As used in the implementation, shipment transit time is the time taken to deliver a shipment from a vendor warehouse to a retailer receiving warehouse. Order fulfillment time is the time taken by the vendor to process a purchase order and to fulfill it. Order fulfillment time is calculated as the difference between the date on which the vendor starts processing the purchase order and the actual ship date from the vendor location. Vendor lead time is defined as the order fulfillment time plus the shipment transit time. A modification cut-off date is the difference between the requested delivery date and the vendor lead time or the difference between the current ship date and the order fulfillment time. The modification cut-off date represents a last opportunity for a retailer to modify a purchase record with minimal impact to the requested delivery date. The order transmit time is the time taken for a purchase record (new or modified) to be communicated from a retailer to a vendor.

In the implementation, purchase records listed in a purchase record reference table such as Table 2 can be labeled or flagged to indicate a status of the purchase record. In the exemplary implementation, status for a purchase record is defined according to a flag appearing in a status flag column of the reference table in the row of the purchase record. The following status flags and definitions can be utilized:

'Blank'=Open purchase record or purchase record is available for processing.
'A'=Purchase record date change previously accepted.
'P'=Purchase record is being processed in present cycle.
'X'=Purchase record will be processed in present cycle but will not be subject to date changes.

Control of inbound transportation from a vendor can be indicated by a transport control flag that is defined at the vendor level. Typically, such a flag indicates either vendor or retailer. The transport control flag can be populated against a 'T' type record in a vendor-item reference master table. A transport control value can impact consolidation ability in addition to the modification cut-off date. For example, when transport is controlled by a retailer and when there are no date changes, minor changes such as using an outside carrier versus backhaul may not need to be communicated to a vendor. Such records can then be treated as processed instead of being tagged as past cut-off date and not processed.

The status of a purchase record can be indicated in various different ways in addition to those described in this implementation.

In the implementation, records with a current delivery date before a current system date are considered as shipped and therefore have a delivery date that can no longer be modified. As a result, records marked as such are excluded from the process. Records whose status flag is 'P' (e.g., from previous logistics pre-processing) can be set to 'Blank' at the beginning of a process. A trailer number can also be set to 'Blank' on all records.

Those records with 'A' or 'X' status do not change status during processing; however, trailer numbers can be assigned to these records. Records having a status of 'A,' 'X,' or 'Blank' are processed.

Pre-Processing to Identify Backhaul Opportunities

During pre-processing based on backhaul opportunities, inbound shipments from a vendor that can be consolidated with outbound shipments from a retailer to stores or distribution centers are identified. In general, a store delivery schedule is compared to purchase records in a reference table. Purchase records can be referred to in the implementation as inbound records, when associated with inbound shipments.

In the implementation, store delivery schedules are first sorted in ascending order of store delivery date and in descending order of a stop sequence on each delivery route. For the stores on a given delivery date, a radial limit parameter is applied to the purchase records reference table to identify compatible purchase records. For example, for a radial limit of 0, records corresponding to shipments from vendor warehouses having the same zip code as a selected store are considered compatible records with the selected store. The days limit parameter can also be applied to identify compatible purchase records having current delivery dates within a predetermined timeframe of the delivery date of the selected store.

For example, if store B is selected from the list of delivery schedules in Table 3 and a radial limit of 0 and a days limit of plus or minus one day is applied to the list of purchase records in Table 2, purchase records 134, 136, 137, and 139 can be identified as compatible purchase records. Purchase records 134, 136, 137, and 139 are compatible purchase records because they have vendor locations with the same zip code as the selected store and current delivery dates that are within one day of the delivery date of the selected store, store B.

Purchase records with a 'M' or 'Must-Go' flag cannot have their date postponed. These records can be processed only if there is no date change or if there is an opportunity for preponement (i.e., an opportunity to move the date closer to a current system date).

Compatible inbound records obtained by applying a days limit process parameter can be checked to confirm that there is enough time to modify the record without impacting the requested delivery date. For example, a modification cut-off date can be calculated and compared to a date that the vendor would receive a modified record. First, the date a vendor receives a record is calculated by adding the current system date to the order transmit time. The modification cut-off date is calculated by subtracting the fulfillment time from the store delivery date. If the date a vendor receives the record is after the modification cut-off date, and the status flag is 'Blank,' then the purchase record is not considered during backhaul processing.

For example, a modification cut-off date and a date a vendor receives the purchase request can be calculated for the compatible purchase record 137 to determine whether the delivery date of purchase record 137 can be changed. For a current system date of Monday and the delivery date of the selected store (i.e., store B) of Wednesday, for a vendor #698 having an order transit time of one day and an order fulfillment time of two days, the date the vendor receives the purchase record is Tuesday (Monday+1 day=Tuesday) and the modification cut-off date is Monday (Wednesday−two days=Monday). Therefore, purchase record 137 for vendor #698 is not processed further since the vendor would receive the modified purchase request after the vendor would need to begin processing the order.

A modification cut-off date can be defined or calculated in various ways for different implementations of a logistics pre-processor. For example, a different definition of a modification cut-off date may apply depending on a level of communication between a retailer and a vendor or on a degree of transportation control by a retailer or a vendor.

For compatible purchase records having current delivery dates that are the same as the selected store delivery date, and the retailer has control over transport associated with the record, the status flag is set to 'Blank.' Such 'Blank' records can be modified to be part of a backhaul process without modification of the delivery date.

Compatible purchase records having a status 'A' or 'X' and a current delivery date that is not the same as the store delivery date are not modified. These records do not benefit from backhaul opportunities because the status 'A' indicates that the delivery date is not to be changed. For example, compatible purchase record 134 remains unmodified because the status is 'A' and the current delivery date is not the same as the store delivery date of the selected store, store B.

Inbound records with a status of 'Blank', 'A', or 'X' with a current delivery date that is the same as the selected store delivery date can be organized into store delivery trailers or other shipping vehicles based on a load building routine. For example, the records can be loaded into a store delivery truck according to a cubing routine that checks for weight and volume limits. Such a cubing routine generally stops when a trailer is full or other capacity parameter has been satisfied. For example, purchase record 136 has a status 'A' and the current ship date is the same as the store delivery date of store B, so purchase record 136 is submitted to a load building routine and combined with the delivery schedule of store B.

Those records that are loaded into store delivery trailers based on the load building routine are then updated in the reference table. For records having a status flag of 'A' or 'X,' a trailer number is set to a store route number (e.g., with a prefix 'B' to indicate backhaul). For example, a trailer number of record 136 can be set to 'B-W1-D,' wherein 'W1' indicates the route number of store B, 'B' indicates backhaul, and 'D' can be replaced by a date (e.g., a calendar date) associated with the purchase record.

For records having a status flag that is not 'A', the status flag is set to 'P' to prevent these records from being processed again. Also, a trailer number is set to a store route number, and a suggested delivery date is set to the store delivery date. For example, compatible purchase record 139 has a suggested delivery date set to "Wednesday," a status changed to 'P,' and a trailer number set to 'W1.'

For records having a status of 'P,' a current delivery date that is not the same as a suggested delivery date, and a suggested delivery date that is not blank, an "Accept/Reject/Exclude" message is sent to a retailer (e.g., a buyer agent) who submitted the purchase record to request approval of a date change. For example, purchase record 139 appears to the retailer who submitted purchase record 139 with a request for approval to change the current delivery date to the suggested delivery date of Wednesday. Approval can be requested through a graphical user interface, for example. Based on input from the retailer, the record is updated in the reference table. For example, if a retailer accepts a suggested delivery date, then a current delivery date is set to the suggested delivery date and a status flag is changed to 'A.' If the retailer rejects the suggested delivery date, then the current delivery date is unchanged and the status flag is 'Blank.' If the retailer chooses to exclude the record from processing, then the current delivery date is retained and the status flag is set to 'X.'

Pre-Processing According to Spatial Process Parameters

For pre-processing based on a spatial proximity parameter, those records having a status of 'Blank,' 'X,' or 'A' and having a trailer number that is blank are sorted in an ascending order according to a current delivery date. For each current delivery date, purchase records are sorted in a descending order according to a distance between a retailer location and a vendor location, such as the distance between a retailer receiving warehouse and a vendor warehouse. A purchase record having the largest distance is identified as a primary purchase record. Primary purchase records can be selected or identified using different sorting routines than those described herein.

For the primary purchase record, the trailer number is set to 'DORx-t,' where t is a running sequence number for the date of the primary purchase record and indicative of a trailer number. Then, status for the primary record is set to 'P.'

A radial limit parameter is then applied the reference table based on the primary purchase record to identify compatible purchase records. For example, purchase records having a same zip code as the primary purchase record can be identified as compatible. A days limit parameter is set to 0 in this portion of the implementation to consolidate purchase records having a same delivery date. Compatible purchase records, therefore, have a same delivery date as the primary purchase record and are spatially compatible with the primary purchase record according to the radial limit parameter. Compatible purchase records are also referred to in the implementation as secondary purchase records. The status for each secondary purchase record is also set to 'P.'

The primary and secondary purchase records are then organized into shipments according to a load building routine. For example, the trailer numbers for the secondary purchase records can be set to 'D0Rx-t.' A load building routine with a cubing constraint can be used so that fractional truckloads can be generated and pre-processed again according to temporal process parameters after spatial consolidation.

Purchase records that are not able to be loaded into a full trailer (for example, based on a full trailer or other threshold limit) have trailer numbers set to 'Blank' (regardless of having a status of 'A,' 'X,' 'P,' or 'Blank'). For purchase records not loaded into a full trailer and having a status of 'P' and a blank trailer number, the status is set to 'Blank.'

Next, a new primary purchase record is selected as the purchase record having the next farthest distance between the retailer receiving warehouse and the vendor warehouse and steps are repeated to process the new primary purchase record until purchase records for a given date have been processed.

Those purchase records that have not been combined or loaded into shipments through this radial limit processing are then pre-processed according to temporal process parameters. Because it is typically desirable to change the purchase record delivery date as little as possible, it is sometimes preferred to first consolidate shipments according to a radial process parameter with a days limit parameter set to 0. Those records that are not associated with consolidated shipments after such processing can then be pre-processed according to a non-zero days limit parameter to consolidate additional shipments.

Pre-Processing According to Spatial and Temporal Process Parameters

For pre-processing based on temporal and spatial proximity parameters, purchase records having a status of 'Blank,' 'X,' or 'A' and whose trailer number is blank are sorted in an ascending order according to current delivery date. For each current delivery date, purchase records are sorted in descending order of distance from the retailer warehouse to the vendor location. A purchase record having the largest distance is identified as a primary purchase record. The status of the primary purchase record is set to 'P.' For each primary purchase record, a days limit and a radial limit are applied to the reference table of purchase records to obtain secondary purchase records which are compatible with each primary purchase record. Primary purchase records can be selected or identified using different sorting routines than those described herein.

For example, in Table 2, for a primary purchase record of purchase record 131, a radial limit of the same zip code, and a days limit of plus or minus two days, purchase records 132, 134, 136, and 137 can be identified as compatible or secondary purchase records. Purchase records 132, 134, 136, and 137 are compatible purchase records because purchase records 132, 134, 136, and 137 have vendor locations that have the same zip code as the vendor location associated with the primary purchase record and current delivery dates that are within two days of the current delivery date of the primary purchase record.

Secondary purchase records with a 'M' or 'Must-Go' flag cannot have a delivery date postponed. These purchase records should be processed only if there is no delivery date change or if there is an opportunity to pre-pone or advance the delivery date. Secondary purchase records without a 'Must-Go' flag should be checked to confirm that there is enough time to modify the record without impacting the requested delivery date. For example, a purchase record modification cut-off date can be calculated and compared to a date that the vendor would receive the modified purchase record. First, the date a vendor receives a purchase record is calculated by adding the current system date to the order transmit time of the secondary purchase record. Then, the purchase record modification cut-off date is calculated by subtracting the order fulfillment time of the secondary purchase record from the current delivery date of the primary purchase record. If the date a vendor receives a purchase record is after the modification cut-off date and the purchase record status is 'A' or 'X,' then neither the purchase record date nor the status is modified.

If a date a vendor receives a purchase record is after the purchase record modification cut-off date and a status flag is not 'A' or 'X,' and if a current delivery date of the secondary purchase record is the same as the current delivery date of the primary purchase record, and the retailer controls transport of shipments associated with the purchase record, then the status flag is set to 'P.'

If a date a vendor receives a purchase record is not after the modification cut-off date, then the status flag is set to 'P' to indicate that the purchase record is being processed and the suggested delivery date is set to the current delivery date of the primary purchase record.

For example, the status for compatible purchase records 132, 134, 136 and 137 is set to 'P' and respective suggested delivery dates are set to Monday.

Next, a new primary purchase record is identified as a purchase record with the next farthest distance from the retailer warehouse to the vendor location. The process continues such that remaining purchase records are processed in a similar manner.

For purchase records having a status 'P' and a current delivery date that is not the same as a suggested delivery date, and the suggested delivery date is not blank, an "Accept/Reject/Exclude" message is sent to a retailer (e.g., a buyer agent) who submitted the purchase record to request approval of a date change. For example, compatible purchase records 132, 134, 136 and 137 would appear to a respective retailer for approval with a request to change the current delivery date to the suggested delivery date of Monday. The suggested delivery date can be presented to the retailer via a graphical user interface, for example. Based on input from the retailer, the purchase records are updated in the reference table. For example, if a retailer accepts a suggested delivery date, then a current delivery date is set to the suggested delivery date and a status flag is changed to 'A.' If the retailer rejects the suggested delivery date, then the current delivery date is unchanged and the status flag is 'Blank.' If the retailer chooses to exclude the purchase record from processing, then the current delivery date is retained and the status flag is set to 'X.'

Because purchase records can be released for consolidation every day, some purchase records which have been consolidated (i.e., having a suggested delivery date that is not blank) can be subjected more than once to pre-processing.

Although the implementation includes detailed conditions for processing purchase records based on status flags and for changing status flags, such conditions can be changed while remaining true to the technologies described herein.

Example 34

Exemplary Implementation with Enhancements

In an exemplary implementation of a logistics pre-processor with enhancements, purchase order records are pre-processed and consolidated based on vendor location and backhaul opportunities, according to spatial proximity parameters, and according to temporal proximity parameters in a similar manner to Example 33, including additional enhancements. In an implementation with enhancements, additional inputs, process parameters, and flags can be included.

For example, in addition to purchase order records, store delivery schedules, process parameters, and a category compatibility matrix can be input into the logistics pre-processor. The category compatibility matrix provides indicators for whether products or goods can be mixed or combined in a shipment. For example, food products can be indicated by the matrix as not compatible with chemical cleaning products. As a result, shipments containing these products will not be combined or consolidated by the system.

In an implementation with enhancements, purchase records can be additionally processed according to process parameters such as a ship date limit, a consolidation level, or both. The ship date limit parameter determines a timeframe such as a number of days relative to a current system date. A purchase record exceeds the ship date limit if the delivery date of a purchase record minus the current system date is larger than the ship date limit. For example, a ship date limit can be 30 days and a purchase record can have a requested delivery date that is more than 30 days from the current system date. Such a record exceeds the ship date limit. Purchase records that exceed the ship date limit are not processed by the logistics pre-processor.

Store delivery schedules that do not exceed a ship date limit are considered for backhaul processing. In addition, processing of purchase records can be limited to those purchase records whose delivery dates do not exceed the ship date limit.

The consolidation level parameter indicates a number of nested searches that the logistics pre-processor should employ for determining compatible records. For example, purchase records that are identified as compatible with a primary purchase record (e.g., through processing of purchase records according to spatial process parameters, temporal process parameters, or both) can be referred to as secondary records. For a consolidation level of 1, the search for compatible purchase records stops after a single processing (i.e., after identifying secondary records). For a consolidation level of 2, additional searches for compatible purchase records (e.g., through processing of purchase records according to spatial process parameters, temporal process parameters, or both) are performed for each secondary record treated as a primary record. In this manner, a tertiary level of compatible records can be identified.

In an implementation with enhancements, purchase records can have an associated receiving warehouse, a mix category flag, or other flags. The receiving warehouse of a purchase record indicates the receiving warehouse of the retailer to which a shipment associated with the purchase record is to be delivered. In general, the receiving warehouse is a buyer location associated with the purchase record.

In an enhanced implementation, backhaul processing of purchase records can be limited to purchase records having a receiving warehouse that is the same as a retailer warehouse for a selected store. For example, outbound shipments from a retailer warehouse can be consolidated using backhaul processing with inbound shipments to the same retailer warehouse. Purchase records can also be identified as compatible based on a same receiving warehouse.

The mix category flag can indicate whether products belonging to different categories can be mixed in a same trailer, truckload, or other shipping unit. The mix category flag can indicate compatibility of load types and can be determined based on a category compatibility matrix. A mix category flag having a setting of 'No,' can reduce a number of purchase records that are identified as compatible and can reduce a number of consolidated shipments generated by a load building processor.

Purchase records can be identified as compatible based on a load type or a mix category flag. For example, a primary record may be defined as not compatible with another purchase record if a mix category flag of the purchase record is set to 'No,' or a category compatibility matrix may need to be used to determine whether the records are compatible.

Example 35

Exemplary Inbound Shipment Consolidation

Figure 23:
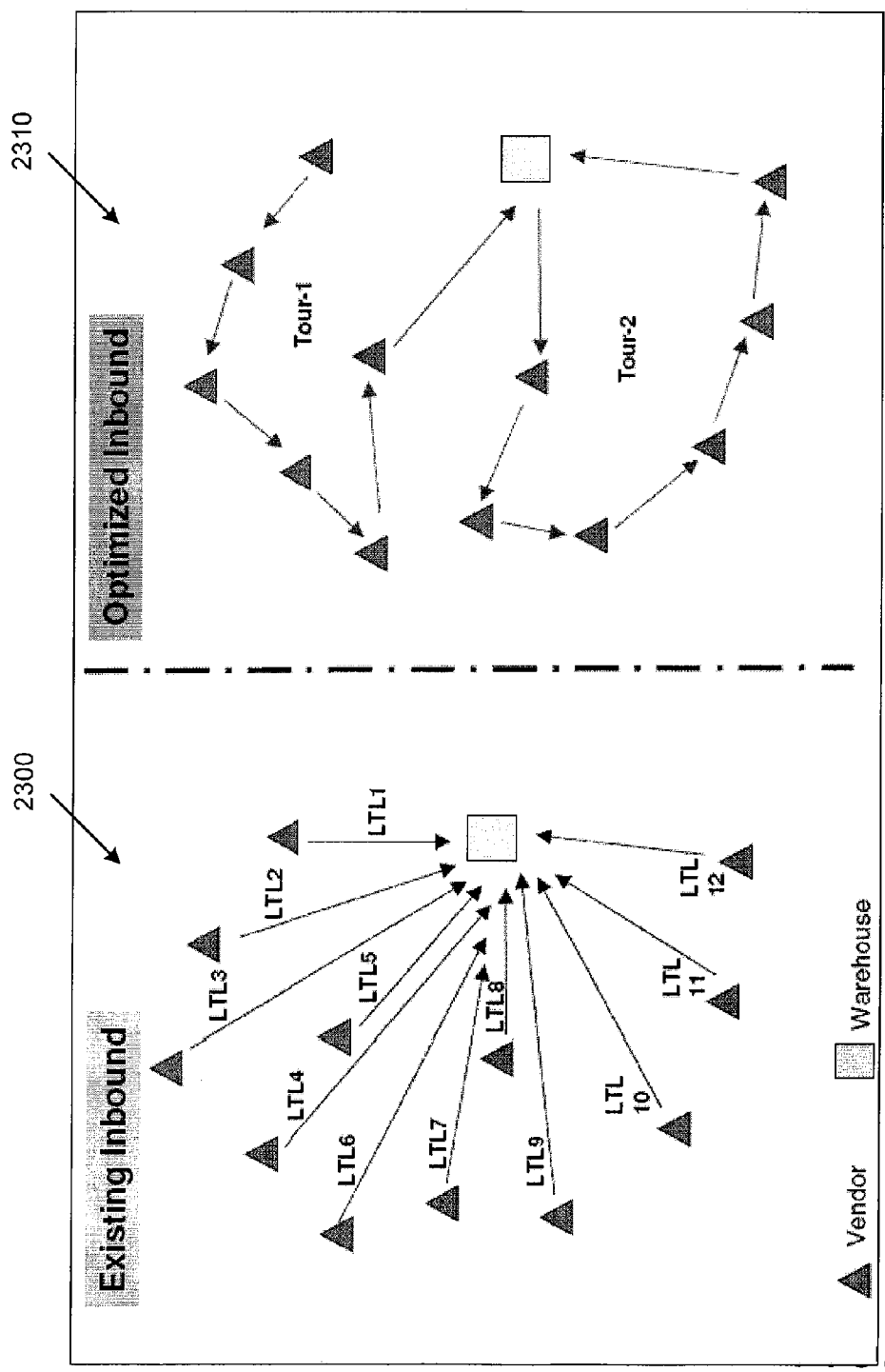
FIG. 23 is a schematic of exemplary optimized inbound transportation.

FIG. 23 is a schematic of exemplary inbound transportation shipments from twelve vendors to a single retailer warehouse. Schematic 2300 illustrates typical inbound shipments generated without pre-processing. The twelve shipments have been labeled LTL1-LTL12 to identify them as less than full truckloads. The twelve shipments can represent, for example, the transport of ordered goods represented by twelve purchase orders submitted by a retailer to the respective vendors without pre-processing the purchase orders. The vendors 1-12 then generated shipments 1-12, such as by processing the purchase orders in a transportation management system. In the situation depicted in schematic 2300, retailers typically pay high transportation costs for the LTL shipments from each vendor.

By implementing pre-processing, the shipments illustrated in FIG. 23 can be optimized and transportation costs can be reduced. Schematic 2310 illustrates inbound shipments after pre-processing. The twelve LTL shipments of schematic 2300 have been consolidated into two routes labeled Tour-1 and Tour-2. In this manner, full truckload shipments can be used to transport goods from the vendors to the receiving distribution center or a retailer warehouse at a reduced cost to the retailer. Shipments can be identified for consolidation according to methods described herein, such as by pre-processing purchase order records associated with the shipments according to spatial or temporal proximity parameters.

Table 4 lists a possible scenario of ship dates and routing information without pre-processing 2300 and with pre-processing 2310 for the vendor to retailer warehouse shipments shown in FIG. 23.

TABLE 4

| Vendor | 2300 Ship Date | 2300 Truck/Route | 2310 Ship Date | 2310 Truck/Route |
|---|---|---|---|---|
| 1 | Monday | 1 | Tuesday | 1 |
| 2 | Tuesday | 2 | Tuesday | 1 |
| 3 | Thursday | 3 | Tuesday | 1 |
| 4 | Thursday | 4 | Tuesday | 1 |
| 5 | Tuesday | 5 | Tuesday | 1 |
| 6 | Tuesday | 6 | Tuesday | 1 |
| 7 | Friday | 7 | Monday | 2 |
| 8 | Friday | 8 | Monday | 2 |
| 9 | Monday | 9 | Monday | 2 |
| 10 | Monday | 10 | Monday | 2 |
| 11 | Tuesday | 11 | Monday | 2 |
| 12 | Monday | 12 | Monday | 2 |

Table 4 demonstrates that, without pre-processing, shipments may be sent out on different days using separate trucks from each of the twelve vendors. With pre-processing, opportunities to consolidate shipments are recognized and the ship dates of the shipments can be changed in order to take advantage of the consolidation opportunities. In this example, shipments from vendors 1-6 were changed to a ship date of Tuesday so that a single truck running on Route-1 could transport shipments 1-6 to the retailer warehouse and shipments 7-12 were changed to a ship date of Monday so that a single truck running on Route-2 could transport shipments 7-12 to the retailer warehouse. In general, transportation costs associated with two trucks traveling two routes (e.g., Routes 1 and 2) are less than transportation costs associated with twelve less than full truckloads traveling from twelve vendors to a single retailer warehouse. Thus, pre-processing can reduce transportation costs by consolidating inbound shipments.

The inbound shipment consolidation of schematic 2310 can be facilitated by coordination of shipments between vendors. For example, pre-processing can generate visibility between vendors. One or more vendors can choose to change a ship date in order to combine shipments with those of other vendors. In this scenario, vendors choose to reduce LTL shipments and to combine shipments into full truckload or fewer LTL routes, such as Tour-1 or Tour-2.

Alternatively, a retailer can choose to control the inbound transportation to their warehouse without the need for vendor cooperation. For example, a retailer can pre-process purchase orders released to the vendors 1-12 to identify opportunities for potential shipment consolidation and then determine an optimized route of inbound shipment transportation based on the pre-processing. Purchase order records can be modified before distribution to the vendors to anticipate consolidated shipping routes such as Tour-1 and Tour-2.

Example 36

Exemplary Outbound Shipment Consolidation

Figure 24:
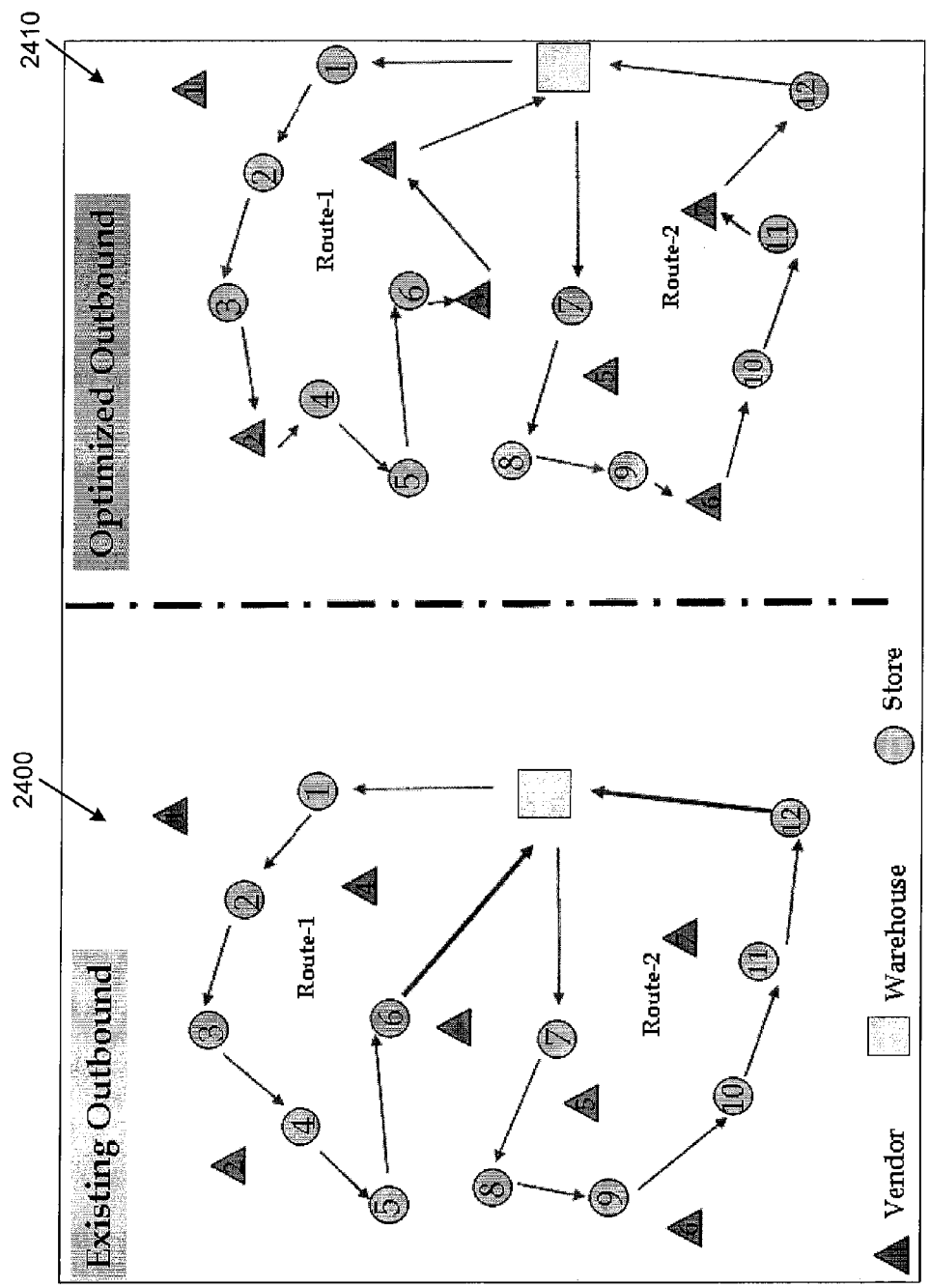
FIG. 24 is a schematic of exemplary optimized outbound transportation.

FIG. 24 is a schematic of exemplary outbound transportation shipments from a retailer warehouse to twelve stores. Schematic 2400 illustrates typical outbound shipments generated without pre-processing. In the situation depicted in schematic 2400, trucks on Route-1 and Route-2 may return to the warehouse empty after depositing shipments at stores 1-12 along each respective route. Therefore, retailers typically pay additional costs for shipments from vendors 1-7 that are located in a general vicinity of the twelve stores.

By implementing pre-processing with backhaul, the shipments illustrated in FIG. 24 can be optimized and transportation costs can be reduced. Schematic 2410 illustrates shipments after pre-processing. In schematic 2410, inbound shipments from vendors 2, 3, and 4, and vendors 6 and 7 have been consolidated into Route-1 and Route-2, respectively. In this manner, trucks on Route-1 and Route-2 return to the warehouse with inbound shipments from vendors thereby reducing transportation costs for the retailer for those inbound shipments. The inbound shipments can be identified for consolidation with outbound shipments by pre-processing purchase order records associated with the inbound shipments.

Tables 5-6 list a possible scenario of ship dates and routing information without pre-processing 2400 and with pre-processing 2410 for vendors and stores shown in FIG. 24. Table 5 shows example vendor shipment schedules for inbound shipments to a retailer warehouse. Table 6 shows example delivery schedules for outbound shipments from the retailer warehouse to retailer stores. The outbound shipments for each store are organized according to two routes, Route-1 and Route-2, and according to a stop # or stop sequence along each respective route. Outbound shipments are typically scheduled to occur on a routine basis.

TABLE 5

| Vendor | 2400 Ship Date | 2400 Route/Stop # | 2410 Ship Date | 2410 Route/Stop # |
|---|---|---|---|---|
| 1 | Monday | 3/1 | Monday | 3/1 |
| 2 | Tuesday | 4/1 | Tuesday | 1/3-1 |
| 3 | Thursday | 5/1 | Tuesday | 1/6-1 |
| 4 | Thursday | 6/1 | Tuesday | 1/6-2 |

TABLE 5-continued

| Vendor | 2400 Ship Date | 2400 Route/Stop # | 2410 Ship Date | 2410 Route/Stop # |
|---|---|---|---|---|
| 5 | Tuesday | 7/1 | Tuesday | 7/1 |
| 6 | Tuesday | 8/1 | Monday | 2/3-1 |
| 7 | Friday | 9/1 | Monday | 2/5-1 |

TABLE 6

| Store | 2400 Ship date | 2400 Route/Stop # | 2410 Ship date | 2410 Route/Stop # |
|---|---|---|---|---|
| 1 | Tuesday | 1/1 | Tuesday | 1/1 |
| 2 | Tuesday | 1/2 | Tuesday | 1/2 |
| 3 | Tuesday | 1/3 | Tuesday | 1/3 |
| 4 | Tuesday | 1/4 | Tuesday | 1/4 |
| 5 | Tuesday | 1/5 | Tuesday | 1/5 |
| 6 | Tuesday | 1/6 | Tuesday | 1/6 |
| 7 | Monday | 2/1 | Monday | 2/1 |
| 8 | Monday | 2/2 | Monday | 2/2 |
| 9 | Monday | 2/3 | Monday | 2/3 |
| 10 | Monday | 2/4 | Monday | 2/4 |
| 11 | Monday | 2/5 | Monday | 2/5 |
| 12 | Monday | 2/6 | Monday | 2/6 |

Without pre-processing, shipments may be sent out from vendors using separate trucks or routes (e.g., routes 3-9 in Table 5) to a retailer warehouse in addition to the outbound shipments to stores (e.g., stores 1-12) from the retail warehouse. With pre-processing, opportunities to consolidate shipments can be recognized and the ship dates of the shipments from the vendors can be changed in order to take advantage of backhaul opportunities.

In this example, after pre-processing, shipments from vendors 2, 3, and 4 were changed to a ship date of Tuesday so that the truck on Route-1 could transport these shipments to the retailer warehouse while delivering outbound shipments to stores 1-6. Vendor locations 2, 3, and 4 are assigned to stops 3-1, 6-1, and 6-2, respectively, on Route-1 and the stop # for stores 1-6 remain the same. Shipments from vendors 6 and 7 were changed to a ship date of Monday so that the truck running on Route-2 could transport these shipments to the retailer warehouse while delivering outbound shipments to stores 7-12. Vendor locations 6 and 7 are assigned to stops 3-1 and 5-1, respectively, on Route-2 and the stop # for stores 7-12 remain the same.

In general, transportation costs are reduced when inbound shipments from vendors are consolidated with existing outbound shipments. Thus, pre-processing can reduce transportation costs by consolidating inbound and outbound shipments. Such consolidation can be referred to as backhaul.

In order to optimize shipments according to schematic 2410, a retailer can pre-process purchase order records to identify opportunities for shipment consolidation with outbound deliveries and then modify purchase order records to take advantage of the consolidation opportunities before releasing the purchase order records to the vendors. For example, the retailer can change a requested date of shipment associated with a purchase order record for a vendor 4 (e.g., before releasing the purchase order record to vendor 4) such that a truck along Route-1 can transport the shipment to the warehouse.

Example 37

Exemplary Transportation Savings from Pre-Processing

Transportation savings based on pre-processing described herein can be estimated. For example, purchase order records can be organized into shipments with and without pre-processing and a number of less than full truckloads and full truckloads generated with and without pre-processing can be compared. In general, a lower number of LTLs and a higher number of full truckloads indicate that LTLs have been consolidated and that cost savings have been realized.

For an exemplary grocery retailer and for one receiving warehouse, a total of approximately 4800 inbound shipments over 6 months were organized into shipments using conventional methods and also using pre-processing according to any of the technologies described herein. During pre-processing, shipments were consolidated based on backhaul opportunities and based on spatial and temporal process parameters. A radial limit and a days limit were varied to observe potential savings for different values of these limits. Table 7 summarizes the results of the analysis.

In Table 7, shipments are organized according to month and each month of shipments has been analyzed according to four scenarios applying different spatial and temporal constraints. The label "D0R0" indicates a days limit of 0 and a radial limit of 0. The label "D0R10" indicates a days limit of 0 and a radial limit of 10. The label "D0R20" indicates a days limit of 0 and a radial limit of 20. The label "D1R20" indicates a days limit of 1 and a radial limit of 20. Table 7

TABLE 7

| Month | Scenario | Total shipments | Shipments consolidated into TLs | No. of TLs | Balance LTLs |
|---|---|---|---|---|---|
| March | D0R0 | 823 | 574 | 157 | 249 |
|  | D0R10 | 823 | 640 | 161 | 183 |
|  | D0R20 | 823 | 652 | 165 | 171 |
|  | D1R20 | 823 | 707 | 175 | 116 |
| April | D0R0 | 706 | 508 | 161 | 198 |
|  | D0R10 | 706 | 548 | 152 | 158 |
|  | D0R20 | 706 | 569 | 162 | 137 |
|  | D1R20 | 706 | 630 | 182 | 76 |
| May | D0R0 | 938 | 657 | 260 | 281 |
|  | D0R10 | 938 | 723 | 270 | 215 |
|  | D0R20 | 938 | 746 | 278 | 192 |
|  | D1R20 | 938 | 819 | 305 | 119 |
| June | D0R0 | 1150 | 834 | 340 | 316 |
|  | D0R10 | 1150 | 913 | 355 | 237 |
|  | D0R20 | 1150 | 933 | 90 | 941 |
|  | D1R20 | 1150 | 1034 | 421 | 116 |
| July | D0R0 | 1089 | 766 | 288 | 323 |
|  | D0R10 | 1089 | 845 | 295 | 244 |
|  | D0R20 | 1089 | 867 | 303 | 222 |
|  | D1R20 | 1089 | 939 | 350 | 150 |
| August | D0R0 | 65 | 60 | 22 | 5 |
|  | D0R10 | 65 | 60 | 21 | 5 |
|  | D0R20 | 65 | 60 | 21 | 5 |
|  | D1R20 | 65 | 64 | 23 | 1 | also indicates a number of shipments that occurred during respective months (i.e., "Total shipments"), a number of shipments consolidated into full truckloads (TLs), a number of shipments that were full truckload shipments (i.e., "No. of TLs"), and a number of shipments that were LTLs (i.e., "Balance LTLs").

Figure 25:
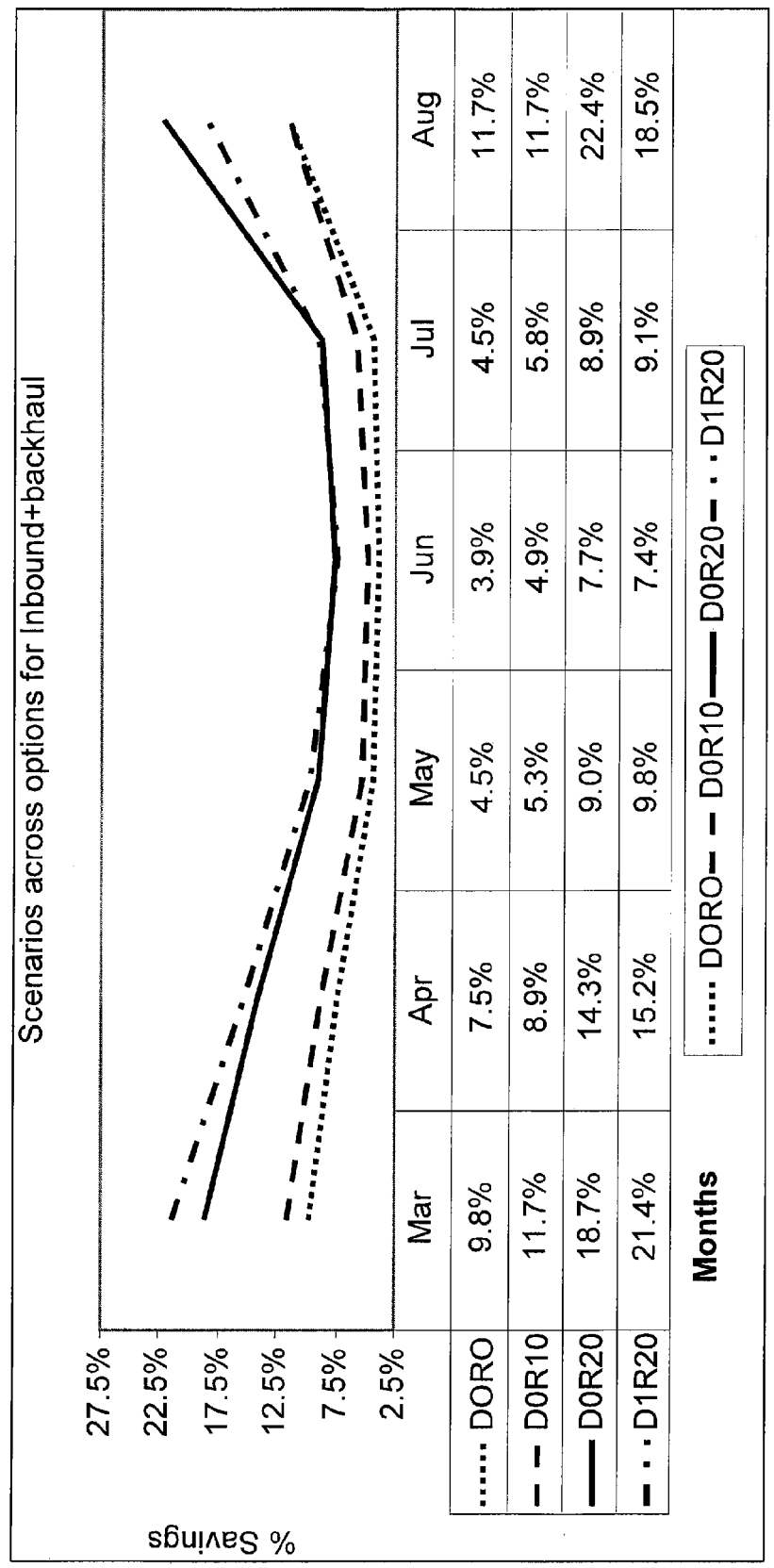
FIG. 25 is a plot of savings resulting from implementation of a logistics pre-processing system.

FIG. 25 is a plot of savings from the consolidation shown in Table 7. For a radial limit of 0 miles (i.e., compatible records have a same zip code) and a days limit of 0 days (i.e., no temporal-proximity search was performed), notated as D0R0, savings in the range of 3.9% to 11.7% across the 6 months of shipments was estimated. These savings resulted from consolidating inbound LTL shipments into potential truckloads with no ship date changes and virtually no detours in the new routing plan. Therefore, significant opportunities exist for cost savings by pre-processing purchase order records.

Other estimates indicate that, when purchase order records are pre-processed, transportation costs can be reduced by at least 1% from current costs. Such savings can range between about $250K and about $300K for every billion dollars in gross sales.

Example 38

Exemplary Storage

In any of the examples herein, storage can be electronic storage for storing data. Exemplary storage can be databases, XML documents, or other structured systems for storing data. Storage can be used, for example, to store purchase order records, lists of purchase order records, delivery schedules, process parameters, suggested modifications, user interfaces, category compatibility matrix, and modified purchase order records.

Example 39

Exemplary Computing Environment

Figure 26:
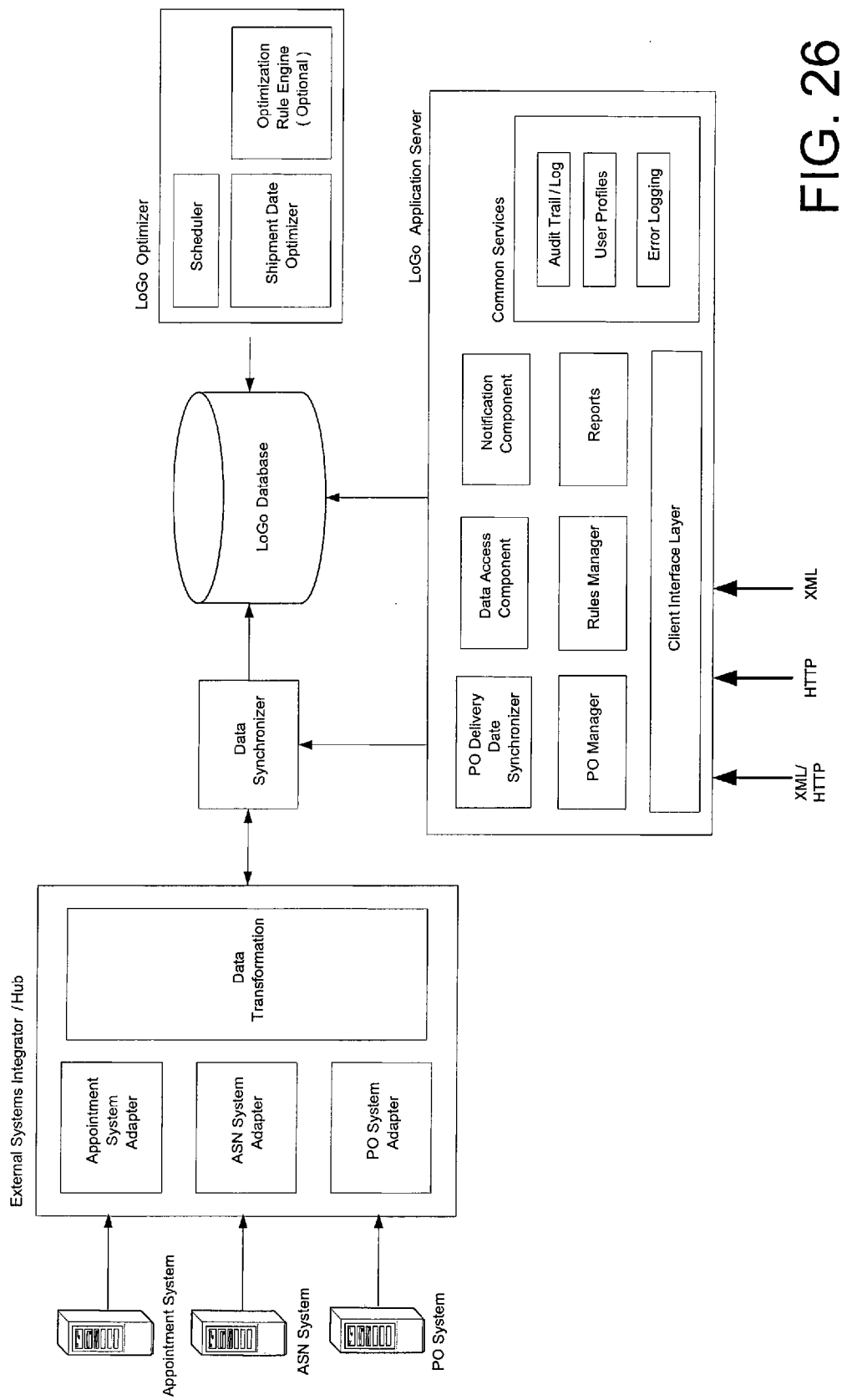
FIG. 26 is block diagram of an exemplary computing environment for implementing any of the technologies described herein.

FIG. 26 illustrates an exemplary computing environment for implementing technologies described herein. For example, the computing environment is an exemplary computing environment for implementing a logistics pre-processor. With reference to FIG. 26, the External Systems Integrator/Hub is a data interface module that can accept inputs from an Appointment System, an ASN System, and a Purchase Order System. For example, the Hub can receive appointment schedules, ASNs, and purchase order data. The Hub can be configured to adapt and transform the received data, and to transmit data to a Data Synchronizer.

The Data Synchronizer module validates incoming data and protects the integrity of data that is supplied to a LoGo Optimizer. The LoGo Application Server can include static components such as a Client Interface Layer, a Reports module, a Rules Manager and other data access and notification components. The LoGo Application Server can be configured by a client via the Client Interface Layer and can transmit notifications to a client via the Client Interface Layer.

The LoGo Optimizer module can include an Optimization Rules Engine, a Scheduler, and a Shipment Date Optimizer. The LoGo Optimizer module is configured to identify consolidation opportunities and to generate suggested target ship dates based on processing parameters set in the Rules Manager. The Scheduler can help to execute pre-processing at a pre-determined or scheduled time such as without being triggered by a user.

The LoGo pre-processor application follows a three tier architecture starting with a presentation (i.e., client interface) layer followed by the application tier which contains business logic, and the data tier which includes data access components. The pre-processor can also include additional services such as reporting and alert notification. Utilities such as audit trail, maintaining user profiles, and error logging can also be included.

Example 40

Exemplary Computing Environment

Figure 27:
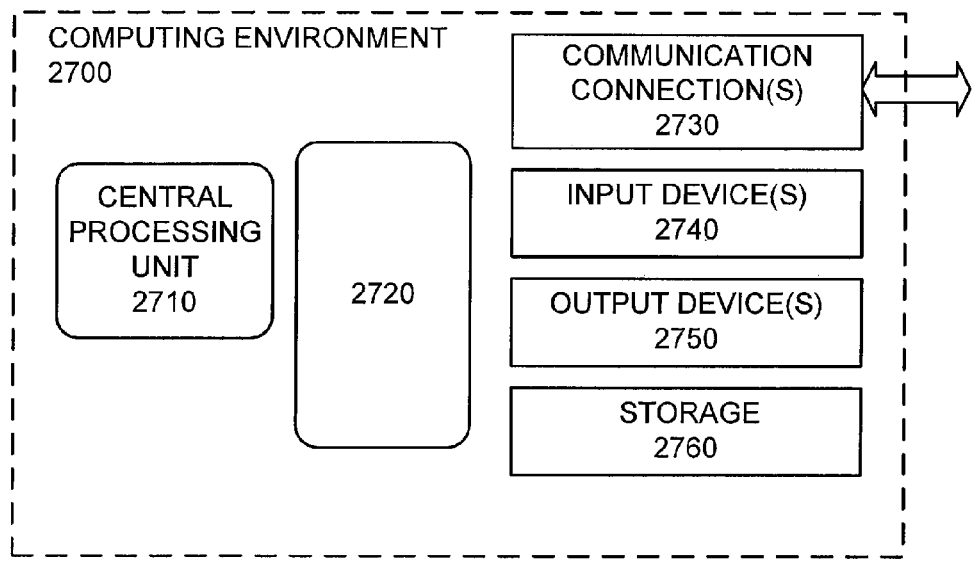
FIG. 27 is a block diagram of an exemplary computing environment for implementing any of the technologies described herein.

FIG. 27 illustrates a generalized example of a suitable computing environment 2700 in which the described techniques can be implemented. For example, computing environment 2700 is an exemplary computing environment for implementing a logistics pre-processor. Computing and processing devices (e.g., physical machines) described herein can be configured as shown in the environment 2700. The computing environment 2700 is not intended to suggest any limitation as to scope of use or functionality, as the technologies can be implemented in diverse general-purpose or special-purpose computing environments. Mobile computing devices can similarly be considered a computing environment and can include computer-readable media. A mainframe environment can be different from that shown, but can also implement any of the technologies described herein and can also have computer-readable media, one or more processors, and the like.

With reference to FIG. 27, the computing environment 2700 includes at least one processing unit 2710 and memory 2720. The processing unit 2710 executes computer-executable instructions and can be a real or a virtual processor. In a multi-processing system, multiple processing units execute computer-executable instructions to increase processing power. The memory 2720 can be volatile memory (e.g., registers, cache, RAM), non-volatile memory (e.g., ROM, EEPROM, flash memory, etc.), or some combination of the two. The memory 2720 can store software implementing any of the technologies described herein.

A computing environment can have additional features. For example, the computing environment 2700 includes storage 2760, one or more input devices 2740, one or more output devices 2750, and one or more communication connections 2730. An interconnection mechanism (not shown) such as a bus, controller, or network interconnects the components of the computing environment 2700. Typically, operating system software (not shown) provides an operating environment for other software executing in the computing environment 2700, and coordinates activities of the components of the computing environment 2700.

The storage 2760 can be removable or non-removable, and includes magnetic disks, magnetic tapes or cassettes, CD-ROMs, DVDs, or any other computer-readable media which can be used to store information and which can be accessed within the computing environment 2700. The storage 2760 can store software containing computer-executable instructions for any of the technologies described herein.

The input device(s) 2740 can be a touch input device such as a keyboard, keypad, touch screen, mouse, pen, or trackball, a voice input device, a scanning device, or another device that provides input to the computing environment 2700. For audio, the input device(s) 2740 can be a sound card or similar device that accepts audio input in analog or digital form, or a CD-ROM reader that provides audio samples to the computing environment. The output device(s) 2750 can be a display, printer, speaker, CD-writer, or another device that provides output from the computing environment 2700.

The communication connection(s) 2730 enable communication over a communication medium to another computing entity. The communication medium conveys information such as computer-executable instructions, audio/video or other media information, or other data in a modulated data signal. Communication media can embody computer-readable instructions, data structures, program modules or other data in a modulated data signal such as a carrier wave or other transport mechanism and includes any information delivery media. A modulated data signal is a signal that has one or more of its characteristics set or changed in such a manner as to encode information in the signal. By way of example, and not limitation, communication media include wired such as a wired network or direct-wired connection and wireless media such as acoustic, RF, infrared and other wireless media. Communication media can be implemented with an electrical, optical, RF, infrared, acoustic, or other carrier. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules can be combined or split between program modules as desired in various embodiments. Computer-executable instructions for program modules can be executed within a local or distributed computing environment.

Example 41

Exemplary Advantages of Purchase Order Record Pre-Processing

Implementation of purchase order record pre-processing in a supply chain increases supply chain visibility and reduce transportation costs. Pre-processing as described herein can reduce a frequency of LTL shipments, reduce inbound transportation costs, reduce handling, provide better on-time delivery, reduce store inventory carrying costs, improve service levels to stores, shorten transit times, reduce the number of damage claims resulting from loss-in-transit, reduce mis-routings, reduce labor costs for receiving warehouses, improve receiving efficiency, improve asset utilization, potentially reduce fleet size, and reduce security challenges.

Pre-processing of purchase order record records can be particularly advantageous for retailers that control transportation of inbound shipments and pre-processing can facilitate such control. For example, by controlling inbound shipments such as by adopting a 'collect' model, more consolidation opportunities may be identified and accepted using pre-processing and cost savings can be increased. When inbound transportation is controlled by the retailer, retailers generally have more control over transportation costs.

Pre-processing purchase order records from two or more buyer agents can increase visibility between those buyer agents and internal visibility can reduce expected transportation costs. For a scenario in which multiple buyers within a single retailer purchase goods from vendors in a same general location, the goods associated with purchase order records submitted by each buyer agent are typically shipped independently by the respective vendors according to a buyer requested delivery date and other shipping parameters. Therefore, these orders can be delivered in multiple independent LTLs to a same retailer warehouse at a high cost to the retailer when the shipments could be consolidated (e.g., combined into a single truck) such as by changing a requested delivery date. Without pre-processing at the planning stage, buyer agents lack the visibility to see potential opportunities to reduce transportation costs by changing a requested delivery date on a purchase order record. By pre-processing the purchase order records, such opportunities for shipment consolidation can be anticipated and the cost savings can be realized. Buyer agents across departments can also make informed decisions regarding collaboration on delivery dates.

Purchase order record pre-processing can also facilitate external visibility such as collaboration with supply chain partners. For example, purchase order record pre-processing can identify opportunities for consolidation of shipments from a first vendor and a second vendor. Through increased visibility of these opportunities, vendors can collaborate to reduce transportation costs and/or to reduce LTL shipments.

Pre-processing technologies described herein can be used in conjunction with and/or combined with current demand planning systems, transportation management systems, or both. For example, purchase order records generated by a demand planning system can be labeled as 'Must-Go' shipments so that such shipments are not delayed as a result of pre-processing. Pre-processing can enhance the functionality of a transportation management system by generating a pre-processed set of purchase order records that can then be processed by the transportation management system. By pre-processing orders that can be input into a transportation management system for execution, such pre-processing enables a typical transportation management system or other load building processors to run more efficiently and to create more full truckloads than without pre-processing. When pre-processing is implemented with a transportation management system, parameters that are common to both systems can be synchronized (e.g., a radial limit parameter can be the same for both systems) such as by an administrator that controls both logistics and purchasing.

A demand planning system can be used to control excess inventory that may arise from advancing dates as a result of pre-processing. For example, impact on inventory levels at a buyer receiving warehouse can be minimized by allowing for sufficient safety stock at the receiving warehouse or by specifying a smaller temporal process parameter (e.g., a lower days limit value). For example, excess inventory can be coordinated with the days limit parameter such that excess inventory would be a temporary event such as only in the first week (assuming demand planning recalculates replenishment quantities every week.). In general, over a longer period of time, excess inventory will tend to be reduced as the number of advances will tend to equal the number of postponements for a given stock keeping unit (SKU). Also, the benefit of transportation savings as achieved through pre-processing will generally outweigh a short-term inventory excess.

Pre-processing technologies described herein can also be implemented by a retailer independent of supply chain partners such as vendors. For example, pre-processing can be internal to an organization. Therefore, purchase order record pre-processing can be relatively easy to implement.

Exemplary Applications

Any of the examples herein can be applied in the area of purchase order record pre-processing and shipment consolidation. Examples described herein can also be applied in other areas where logistics pre-processing is desired. In addition, the technologies described herein can be used in combination with other such systems.

Methods in Computer-Readable Media

Any of the methods described herein can be implemented by computer-executable instructions in one or more computer-readable media (e.g., computer-readable storage media, other tangible media, or the like). Such computer-executable instructions can cause a computer to perform the described method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of these claims.

We claim:

1. A computer-implemented method comprising:
receiving purchase order records from one or more buyer agents, wherein the purchase order records include one or more orders for inbound shipments from one or more vendor locations to one or more locations associated with the one or more buyer agents by respective target ship dates;
in a computer, processing the received purchase order records based on a stored schedule of delivery dates for outbound shipments using one or more temporal and spatial process parameters, wherein the outbound shipments are from a first location associated with the one or more buyer agents to a second location associated with the one or more buyer agents and the process parameters specify conditions under which the received purchase order records are identified as compatible with the outbound shipments;
based on the processing, identifying one or more of the received purchase order records as compatible with one or more of the outbound shipments, wherein the identifying comprises determining that at least one of the compatible purchase order records has a target ship date different from a delivery date of the one or more of the outbound shipments;
responsive to the identifying, providing a buyer agent with a request for authorization to change the target ship date of the at least one of the compatible purchase order records to the delivery date of the one or more of the outbound shipments, wherein providing the request for authorization to change the target ship date comprises providing a user interface displaying details of the at least one of the compatible purchase order records along with one or more other purchase order records;
receiving authorization from the buyer agent to modify the at least one of the compatible purchase order records via the user interface, wherein the receiving authorization comprises receiving input from the buyer agent via one or more fields or buttons displayed as part of the user interface; and
responsive to receiving authorization from the buyer agent, modifying the at least one of the compatible purchase order records, wherein the modifying comprises:
changing the target ship date of the at least one of the compatible purchase order records to be the delivery date of the one or more of the outbound shipments.

2. The method of claim 1, wherein the compatible purchase order records are from different buyer agents.

3. The method of claim 1, wherein the identifying comprises:
comparing the respective target ship dates of the received purchase order records based on one or more temporal process parameters specifying conditions under which purchase order records are identified as compatible;
based on the comparing, determining that two or more of the received purchase order records associated with different target ship dates are temporally compatible because of temporal proximity;

responsive to the determining, providing the buyer agent with a request for authorization to change the respective target ship date of at least one of the temporally compatible purchase order records so that the temporally compatible purchase order records have a same target ship date;

receiving authorization from the buyer agent; and responsive to receiving authorization from the buyer agent, changing the respective target ship date of the at least one of the temporally compatible purchase order records.

4. The method of claim 1, wherein:

the at least one of the compatible purchase order records is associated with a first shipment from a first vendor location; and the method further comprises:

processing the modified at least one of the compatible purchase order records and the one or more outbound shipments according to load building parameters to assign the first shipment and the one or more outbound shipments to a same shipping unit.

5. The method of claim 1, wherein:

the identifying comprises assigning respective status indicators to the received purchase order records to indicate whether purchase order records are compatible; and responsive to receiving authorization from the buyer agent, changing status of at least one purchase order record to indicate whether the at least one purchase order record is to be consolidated with one or more outbound shipments.

6. The method of claim 1, further comprising:

determining that the at least one of the compatible purchase order records is associated with the buyer agent; and routing a suggestion related to the modifying to the buyer agent associated with the at least one of the compatible purchase order records for authorization by the buyer agent.

7. The method of claim 1, wherein the providing of the user interface comprises:

displaying to the buyer agent the delivery date on the user interface and a request to change the target ship date of the at least one of the compatible purchase order records to the delivery date.

8. The method of claim 1, further comprising:

comparing the respective vendor locations of the received purchase order records based on one or more spatial process parameters specifying conditions under which purchase order records are identified as compatible;

based on the comparing, determining that two or more of the received purchase order records associated with different vendor locations are spatially compatible because of spatial proximity; and changing the respective target ship date of at least one of the spatially compatible purchase order records so that the spatially compatible purchase order records have a same target ship date.

9. The method of claim 1, wherein the delivery date is later in time than the target ship date.

10. The method of claim 1, further comprising:

determining whether the target ship date of the at least one of the compatible purchase order records is changeable, wherein the buyer agent is provided with the request for authorization when the target ship date of the at least one of the compatible purchase order records is determined to be changeable.

11. A computer-implemented method comprising:

selecting a first purchase order record to be a primary record having a first requested date and associated with a first supplier location, the primary record being selected from stored purchase order records having respective requested dates and respective supplier locations;

determining a range of dates using the first requested date and one or more temporal proximity parameters;

for remaining stored purchase order records having requested dates within the range of dates and respective supplier locations different from the first supplier location, determining spatial proximity of the different supplier locations to the first supplier location;

comparing the determined spatial proximities to a radial limit;

based on the comparing, identifying at least one purchase order record from the remaining stored purchase order records having a second requested date within the range of dates and having a second supplier location different from the first supplier location with spatial proximity to the first supplier location less than the radial limit as compatible with the primary record; and in a computer, responsive to an authorization received from a user interface displaying details of the at least one compatible purchase order record along with one or more other purchase order records, wherein the authorization is received via the user interface based on input via one or more fields or buttons displayed as part of the user interface, changing the second requested date of the at least one compatible purchase order record to the first requested date, thereby generating a modified purchase order record.

12. The method of claim 11, wherein the determining a range of dates comprises:

determining a range of dates within a predetermined timeframe of the first requested date, wherein the timeframe is specified by the one or more temporal proximity parameters.

13. The method of claim 11, wherein the determining spatial proximity of the different supplier locations to the first supplier location comprises:

for remaining stored purchase order records having requested dates within the range of dates and respective supplier locations different from the first supplier location, determining a distance from the first supplier location associated with the primary record to the different supplier locations;

and the comparing the determined spatial proximities to a radial limit comprises:

determining that the distance from the first supplier location associated with the primary record to the second supplier location is less than the radial limit.

14. The method of claim 11, further comprising:

detecting that shipments associated with the at least one compatible purchase order record and the primary record can be consolidated; and assigning the shipments to a same shipping unit to be shipped on the first requested date.

15. The method of claim 11, further comprising:

determining whether the at least one compatible purchase order record is changeable, wherein the changing of the second requested date is performed responsive to the determination and to receiving authorization from a buyer agent to change the respective requested date of the at least one compatible purchase order record.

16. The method of claim 11, further comprising:
releasing the modified purchase order record to one or more suppliers associated with the at least one compatible purchase order record.

17. The method of claim 11, wherein method further comprises:
combining a first shipment associated with the primary record with a second shipment associated with the at least one compatible purchase order record.

18. The method of claim 11, further comprising:
processing the stored purchase order records based on a stored schedule of delivery dates for outbound shipments using temporal and spatial process parameters, wherein the outbound shipments are from a location associated with a buyer agent;
identifying one or more of the stored purchase order records as compatible with one or more of the outbound shipments based at least in part on relative proximity of the location associated with the buyer agent to the respective supplier locations of the one or more compatible purchase order records; and
combining the one or more of the outbound shipments with a shipment associated with the one or more compatible purchase order records, or modifying the respective requested dates of the one or more compatible purchase order records to correspond to a delivery date of the one or more outbound shipments.

19. A computer-implemented method comprising:
receiving a first purchase order record from a buyer agent of a buyer, the purchase order record having a first requested date indicating a target ship date and being associated with a first vendor location and a first load type;
in a computer, before the first purchase order record is released by the buyer, determining a range of dates using the first requested date and one or more temporal proximity parameters;
identifying from stored purchase order records associated with respective requested dates, respective load types, and respective vendor locations purchase order records having requested dates within the range of dates and respective vendor locations different from the first vendor location;
determining spatial proximity of the different vendor locations to the first vendor location for the identified purchase order records;
comparing the first load type to respective load types for identified purchase order records having requested dates within the range of dates and spatial proximities to the first vendor location less than a radial limit;
based on the comparing, identifying one or more of the stored purchase order records having a second requested date within the range of dates, having a second vendor location different from the first vendor location with spatial proximity to the first vendor location less than the radial limit, and having a second load type compatible with the first load type as compatible with the first purchase order record;
displaying a user interface to the buyer agent of the buyer indicating a suggested date for the first purchase order record that is different from the first requested date, wherein the suggested date is the second requested date;
receiving input from the buyer agent regarding the suggested date via one or more fields or buttons displayed to the buyer agent as part of the user interface; and
changing the requested date of the first purchase order record to the suggested date based on the input, thereby creating a modified purchase order record.

20. The method of claim 19, further comprising:
releasing the modified purchase order record for processing by a transportation management system.

21. The method of claim 19, wherein changing the requested date of the purchase order record to the suggested date results in a consolidated shipment for the first purchase order record and the at least one of the compatible purchase order records.

22. The method of claim 19, further comprising:
comparing the first requested date of the first purchase order record to stored outbound shipment delivery dates;
wherein the suggested date is at least one of the stored outbound shipment delivery dates.

23. A system comprising:
one or more non-transitory computer readable media storing purchase order records, respective requested target ship dates of the purchase order records, respective supplier locations of the purchase order records, and associations between the purchase order records and one or more buyer agents that placed respective of the purchase order records;
a processor configured to determine a range of dates using one or more temporal proximity parameters; to determine purchase order records having requested dates within the range of dates; to determine spatial proximity of the respective supplier locations to a selected supplier location; to compare the determined spatial proximities to a radial limit; based on the comparing, to identify spatially and temporally compatible purchase order records having requested dates within the range of dates and having supplier locations different from the selected supplier location with spatial proximity to the selected supplier location less than the radial limit; records, to determine whether respective requested target ship dates of the compatible purchase order records are changeable, and to change requested target ship dates of one or more compatible purchase order records based on the determining;
a software-driven user interface configured to display to a buyer agent a request to accept or reject changes to the one or more compatible purchase order records based on a respective stored association for the one or more compatible purchase order records, wherein the software-driven user interface displays details for a plurality of purchase order records, and wherein the user interface is further configured to display one or more fields or buttons associated with the request and to transmit an authorization to accept or reject changes to the processor based on input via the one or more fields or buttons; and
a load building processor system configured to organize one or more spatially and temporally compatible purchase order records having changed requested target ship dates into consolidated shipments.

24. An apparatus comprising:
a computer system;
means for receiving purchase order records associated with respective supplier locations from one or more buyer agents;
means for determining for received purchase order records having respective supplier locations different from a selected supplier location, spatial proximity of the different supplier locations to the selected supplier location;

means for comparing the determined spatial proximities to a radial limit;

means for identifying one or more of the received purchase order records having respective supplier locations different from the selected supplier location with spatial proximity to the selected supplier location less than the radial limit as compatible purchase order records;

means for receiving authorization from a buyer agent to modify at least one of the compatible purchase order records, wherein the means displays details for a plurality of purchase order records, and is per-purchase order record selectable, and wherein the means displays one or more fields or buttons associated with the authorization to modify the at least one of the compatible purchase order records; and means for consolidating the at least one of the compatible purchase order records with one or more others of the compatible purchase order records based on the authorization, wherein the consolidating of the at least one of the compatible purchase order records with the one or more others of the compatible purchase order records consolidates shipments eventually associated with the at least one of the compatible purchase order records and the one or more others of the compatible purchase order records.

25. One or more non-transitory computer-readable media storing computer-executable instructions, which, when executed by a computer, cause the computer to perform a method, the method comprising:

receiving purchase order records from one or more buyer agents, wherein the purchase order records include one or more orders for inbound shipments from one or more vendor locations to one or more locations associated with the one or more buyer agents by respective target ship dates;

processing the received purchase order records based on a stored schedule of delivery dates for outbound shipments using one or more temporal and spatial process parameters, wherein the outbound shipments are from a first location associated with the one or more buyer agents to a second location associated with the one or more buyer agents and the process parameters specify conditions under which the received purchase order records are identified as compatible with the outbound shipments;

based on the processing, identifying one or more of the received purchase order records as compatible with one or more of the outbound shipments, wherein the identifying comprises determining that at least one of the compatible purchase order records has a target ship date different from a delivery date of the one or more of the outbound shipments;

responsive to the identifying, providing a buyer agent with a request for authorization to change the target ship date of the at least one of the compatible purchase order records to the delivery date of the one or more of the outbound shipments, wherein providing the request for authorization to change the target ship date comprises providing a user interface displaying details of the at least one of the compatible purchase order records along with one or more other purchase order records;

receiving authorization from the buyer agent to modify the at least one of the compatible purchase order records via the user interface, wherein the receiving authorization comprises receiving input from the buyer agent via one or more fields or buttons displayed as part of the user interface; and responsive to receiving authorization from the buyer agent, modifying the at least one of the compatible purchase order records, wherein the modifying comprises:

changing the target ship date of the at least one of the compatible purchase order records to be the delivery date of the one or more of the outbound shipments.

* * * * *

UNITED STATES PATENT AND TRADEMARK OFFICE
CERTIFICATE OF CORRECTION

PATENT NO.         : 8,655,736 B2                                           Page 1 of 1
APPLICATION NO.    : 11/965717
DATED              : February 18, 2014
INVENTOR(S)        : Bharadwaj et al.

It is certified that error appears in the above-identified patent and that said Letters Patent is hereby corrected as shown below:

In the Claims:

Column 44, lines 37-38, claim 23, "records, to determine" should read --to determine--

Signed and Sealed this
First Day of March, 2016

Michelle K. Lee
*Director of the United States Patent and Trademark Office*